United States Patent
Yang et al.

(10) Patent No.: US 10,069,947 B2
(45) Date of Patent: Sep. 4, 2018

(54) METHOD AND APPARATUS FOR PROCESSING DATA PACKET BASED ON PARALLEL PROTOCOL STACK INSTANCES

(71) Applicant: Huawei Technologies Co., Ltd., Shenzhen (CN)

(72) Inventors: Yongqiang Yang, Beijing (CN); Fen Dai, Shenzhen (CN); Liufei Wen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 265 days.

(21) Appl. No.: 15/222,753

(22) Filed: Jul. 28, 2016

(65) Prior Publication Data
US 2016/0337483 A1 Nov. 17, 2016

Related U.S. Application Data

(63) Continuation of application No. PCT/CN2014/091614, filed on Nov. 19, 2014.

(30) Foreign Application Priority Data

Jan. 29, 2014 (CN) .......................... 2014 1 0043721

(51) Int. Cl.
*G06F 15/16* (2006.01)
*H04L 29/06* (2006.01)
*H04L 29/08* (2006.01)

(52) U.S. Cl.
CPC ............ *H04L 69/162* (2013.01); *H04L 69/30* (2013.01)

(58) Field of Classification Search
CPC ..... H04L 69/30; H04L 69/162; H04L 13/168; H04L 12/28

(Continued)

(56) References Cited

U.S. PATENT DOCUMENTS 7,715,428 B2    5/2010  Basso et al.
7,822,025 B1 * 10/2010  Joly ...................... H04L 45/245
                                                        370/389

(Continued)

FOREIGN PATENT DOCUMENTS

CN          1870654 A     11/2006
CN        101132456 A      2/2008

(Continued)

OTHER PUBLICATIONS

Partial English Translation and Abstract of Chinese Patent Application No. CN101415025, Apr. 22, 2009, 23 pages.

(Continued)

*Primary Examiner* — Frantz Jean
(74) *Attorney, Agent, or Firm* — Conely Rose, P.C.

(57) ABSTRACT

A method and an apparatus for processing a data packet based on parallel protocol stack instances, where lower-layer protocol processing is performed, using a first protocol stack instance. An associated second protocol stack instance is determined using a target socket after the target socket that is needed to perform upper-layer protocol processing on the data packet is determined, and the upper-layer protocol processing is performed, using the target socket and the second protocol stack instance. The second protocol stack instance that performs the upper-layer protocol processing is determined using the target socket, and hence, a technical problem that protocol processing cannot be performed on a data packet because a protocol stack instance specified by an application (APP) conflicts with a protocol stack instance specified by a network adapter is resolved.

20 Claims, 7 Drawing Sheets

(58) Field of Classification Search
USPC .......................................................... 709/230
See application file for complete search history.

(56) References Cited

U.S. PATENT DOCUMENTS

| | | | |
|---|---|---|---|
| 8,849,972 B2 | 9/2014 | Tsym | |
| 2004/0078377 A1* | 4/2004 | Begg | G06F 17/30557 |
| 2005/0050202 A1* | 3/2005 | Aiken, Jr. | G06F 9/5033 |
| | | | 709/227 |
| 2005/0276281 A1 | 12/2005 | Jones | |
| 2006/0023718 A1* | 2/2006 | Joly | H04L 45/245 |
| | | | 370/392 |
| 2007/0242671 A1 | 10/2007 | Christenson et al. | |
| 2008/0031267 A1* | 2/2008 | Imao | H04L 69/16 |
| | | | 370/401 |
| 2008/0181245 A1 | 7/2008 | Basso et al. | |
| 2011/0096664 A1* | 4/2011 | Petry | G06F 15/16 |
| | | | 370/231 |
| 2016/0337482 A1 | 11/2016 | Gu et al. | |

FOREIGN PATENT DOCUMENTS

| | | |
|---|---|---|
| CN | 101217464 A | 7/2008 |
| CN | 101227504 A | 7/2008 |
| CN | 101399692 A | 4/2009 |
| CN | 101415025 A | 4/2009 |
| CN | 101426027 A | 5/2009 |
| CN | 101541098 A | 9/2009 |
| CN | 101656677 A | 2/2010 |
| CN | 101741832 A | 6/2010 |
| CN | 101867558 A | 10/2010 |
| CN | 101931584 A | 12/2010 |
| CN | 102523208 A | 6/2012 |
| EP | 1385313 A1 | 1/2004 |
| EP | 2003571 A2 | 12/2008 |
| JP | 2002502189 A | 1/2002 |
| WO | 9939488 A1 | 8/1999 |
| WO | 2012105677 A1 | 8/2012 |
| WO | 2015113437 A1 | 8/2015 |

OTHER PUBLICATIONS

Partial English Translation and Abstract of Chinese Patent Application No. CN101656677, Feb. 24, 2010, 16 pages.
Partial English Translation and Abstract of Chinese Patent Application No. CN101931584, Dec. 29, 2010, 10 pages.
Partial English Translation and Abstract of Chinese Patent Application No. CN102523208, Jun. 27, 2012, 11 pages.
Pesterev, A., et al., "Improving Network Connection Locality on Multicore Systems," XP55229188, Proceedings of the 7th ACM European Conference on Computer Systems, Apr. 10-13, 2012, 14 pages.
Gu, Q., et al., "StackPool: A High-Performance Scalable Network Architecture on Multi-core Servers," XP32606211, IEEE International Conference on High Performance Computing and Communications, Nov. 13, 2013, pp. 17-28.
Marian, T., et al., "Operating Systems Abstractions for Software Packet Processing in Datacenters," Jan. 2011, 200 pages.
Shalev, L., et al., "IsoStack—Highly Efficient Network Processing on Dedicated Cores," IBM Research, Jun. 23-25, 2010, 14 pages.
Hurwitz, J., et al., "End-To-End Performance of 10-Gigabit Ethernet on Commodity Systems," IEEE Micro, 2004, pp. 10-22.
Zhang, K., et al., "Building High-performance Application Protocol Parsers on Multi-core Architectures," IEEE 17th International Conference on Parallel and Distributed Systems, 2011, pp. 188-195.
Foreign Communication Form a Counterpart Application, Chinese Application No. 201410043721.0, Chinese Search Report dated Oct. 15, 2014, 5 pages.
Foreign Communication From a Counterpart Application, European Application No. 14880468.5, Extended European Search Report dated Nov. 24, 2016, 8 pages.
Foreign Communication From a Counterpart Application, PCT Application No. PCT/CN2014/091614, English Translation of International Search Report dated Feb. 17, 2015, 2 pages.
Foreign Communication From a Counterpart Application, PCT Application No. PCT/CN2014/091614, English Translation of International Search Report dated Feb. 17, 2015, 7 pages.
Machine Translation and Abstract of International Publication No. WO2012105677, Aug. 9, 2012, 38 pages.
Nishio, N., et al., "iReserve Architecture: An Integrated Resource Reservation Mechanism," Journal of Information Processing Society of Japan, vol. 40, No. 6, Jun. 15, 1999, 14 pages.
Foreign Communication From a Counterpart Application, Japanese Application No. 2016-549111, Japanese Office Action dated Oct. 3, 2017, 7 pages.
Foreign Communication From a Counterpart Application, Japanese Application No. 2016-549111, English Translation of Japanese Office Action dated Oct. 3, 2017, 8 pages.

* cited by examiner

METHOD AND APPARATUS FOR PROCESSING DATA PACKET BASED ON PARALLEL PROTOCOL STACK INSTANCES

CROSS-REFERENCE TO RELATED APPLICATIONS

This application is a continuation of International Application No. PCT/CN2014/091614, filed on Nov. 19, 2014, which claims priority to Chinese Patent Application No. 201410043721.0, filed on Jan. 29, 2014, both of which are hereby incorporated by reference in their entireties.

TECHNICAL FIELD

The present disclosure relates to the communications technologies, and in particular, to a method and an apparatus for processing a data packet based on parallel protocol stack instances.

BACKGROUND

As cloud computing develops rapidly, a higher requirement is imposed on a processing capability of a protocol stack instance. Currently, because a manner in which multiple protocol stack instances share one socket is usually used, there exists a problem that multiple protocol stack instances contend for a socket, and therefore, parallel protocol stack instances in a multi-core central processing unit (CPU) architecture are put forward. The parallel protocol stack instances include at least two protocol stack instances, and each protocol stack instance runs on a virtual central processing unit (VCPU) of a CPU, and uses a manner of exclusively occupying a socket associated with the protocol stack instance, to avoid the foregoing problem that multiple protocol stack instances contend for one socket. When a network adapter distributes data packets to protocol stack instances according to a distribution policy, the protocol stack instances may perform protocol processing in parallel on the data packets using sockets associated with the protocol stack instances.

However, when an application (APP) instructs to create a socket needed to perform the foregoing protocol processing, the APP specifies an association relationship between a socket and a protocol stack instance. In this way, only an associated protocol stack instance specified by the APP can occupy the socket to perform protocol processing on a data packet, and when a protocol stack instance to which a network adapter distributes a data packet is different from a protocol stack instance that is specified by the APP and that is associated with the socket, that is, a case in which a protocol stack instance specified by an APP conflicts with a protocol stack instance specified by a network adapter occurs, protocol processing cannot be performed on the data packet.

SUMMARY

To resolve the problem in the prior art, embodiments of the present disclosure provide a method and an apparatus for processing a data packet based on parallel protocol stack instances.

According to a first aspect, a method for processing a data packet based on parallel protocol stack instances is provided, where the parallel protocol stack instances include at least a first protocol stack instance and a second protocol stack instance, and the method includes performing, using the first protocol stack instance, lower-layer protocol processing on a data packet that is distributed by a network adapter to the first protocol stack instance, determining a target socket that is needed to perform upper-layer protocol processing on the data packet on which the lower-layer protocol processing has been performed, determining, according to the target socket, the second protocol stack instance that is associated with the target socket, and performing, using the target socket and the second protocol stack instance, the upper-layer protocol processing on the data packet on which the lower-layer protocol processing has been performed, where the lower-layer protocol processing and the upper-layer protocol processing jointly accomplish complete protocol processing on the data packet.

In a first possible implementation manner of the first aspect, determining, according to the target socket, the second protocol stack instance that is associated with the target socket includes determining, according to affinity that is in an affinity graph and that is between the target socket and each protocol stack instance included in the parallel protocol stack instances, the second protocol stack instance that is associated with the target socket, where the affinity between the target socket and each protocol stack instance is used to indicate a quantity of data packets, on which the upper-layer protocol processing needs to be performed using the target socket, in data packets already distributed by the network adapter to each protocol stack instance.

With reference to the first possible implementation manner of the first aspect, in a second possible implementation manner of the first aspect, before determining, according to affinity that is in an affinity graph and that is between the target socket and each protocol stack instance included in the parallel protocol stack instances, the second protocol stack instance that is associated with the target socket, the method further includes updating, according to a quantity of data packets on which the lower-layer protocol processing has been performed, affinity that is recorded in the affinity graph and that is between the target socket and the first protocol stack instance.

With reference to the second possible implementation manner of the first aspect, in a third possible implementation manner of the first aspect, after updating, according to a quantity of data packets on which the lower-layer protocol processing has been performed, affinity that is recorded in the affinity graph and that is between the target socket and the first protocol stack instance, the method further includes determining whether n×A is greater than B, where A is the affinity between the target socket and the first protocol stack instance, B is affinity that is recorded in the affinity graph and that is between the target socket and an associated protocol stack instance, and n is a preset coefficient, and determining, according to affinity that is in an affinity graph and that is between the target socket and each protocol stack instance included in the parallel protocol stack instances, the second protocol stack instance that is associated with the target socket includes determining that the protocol stack instance that is recorded in the affinity graph and that is associated with the target socket is used as the second protocol stack instance that is associated with the target socket if n×A is not greater than B.

With reference to the third possible implementation manner of the first aspect, in a fourth possible implementation manner of the first aspect, determining, according to affinity that is in an affinity graph and that is between the target socket and each protocol stack instance included in the parallel protocol stack instances, the second protocol stack instance that is associated with the target socket further includes determining the first protocol stack instance as the second protocol stack instance that is associated with the target socket, and updating the protocol stack instance that is recorded in the affinity graph and that is associated with the target socket to the first protocol stack instance if n×A is greater than B.

With reference to the first aspect, the first possible implementation manner of the first aspect, the second possible implementation manner of the first aspect, the third possible implementation manner of the first aspect, and the fourth possible implementation manner of the first aspect, in a fifth possible implementation manner of the first aspect, determining a target socket that is needed to perform upper-layer protocol processing on the data packet on which the lower-layer protocol processing has been performed includes searching a socket list to obtain the target socket that is needed to perform the upper-layer protocol processing on the data packet on which the lower-layer protocol processing has been performed.

With reference to the first aspect, the first possible implementation manner of the first aspect, the second possible implementation manner of the first aspect, the third possible implementation manner of the first aspect, and the fourth possible implementation manner of the first aspect, in a sixth possible implementation manner of the first aspect, performing, using the target socket and the second protocol stack instance, the upper-layer protocol processing on the data packet on which the lower-layer protocol processing has been performed includes adding, to a lower-layer data receiving queue of the target socket, the data packet on which the lower-layer protocol processing has been performed, and performing the upper-layer protocol processing on the data packet in the lower-layer data receiving queue using the second protocol stack instance when the target socket is obtained by means of polling according to a protocol stack instance association linked list that corresponds to the second protocol stack instance, where the protocol stack instance association linked list that corresponds to the second protocol stack instance is used to indicate a socket that is associated with the second protocol stack instance.

With reference to the first aspect, the first possible implementation manner of the first aspect, the second possible implementation manner of the first aspect, the third possible implementation manner of the first aspect, and the fourth possible implementation manner of the first aspect, in a seventh possible implementation manner of the first aspect, before determining a target socket that is needed to perform upper-layer protocol processing on the data packet on which the lower-layer protocol processing has been performed, the method further includes creating, using a parent protocol stack instance in protocol stack instances included in the parallel protocol stack instances, the target socket that is not associated with any one of the protocol stack instances, where the parent protocol stack instance is selected by an APP in a random manner, or in a parameter specifying manner, or in a load balancing manner.

With reference to the first aspect, the first possible implementation manner of the first aspect, the second possible implementation manner of the first aspect, the third possible implementation manner of the first aspect, and the fourth possible implementation manner of the first aspect, in an eighth possible implementation manner of the first aspect, the method further includes receiving a first data packet sent by an APP, determining the target socket that is needed to perform protocol processing on the first data packet, determining the second protocol stack instance that is associated with the target socket, and performing protocol processing on the first data packet using the target socket and the second protocol stack instance.

According to a second aspect, a method for processing a data packet based on parallel protocol stack instances is provided, where the parallel protocol stack instances include at least a first protocol stack instance and a second protocol stack instance, and the method includes receiving a first data packet sent by an APP, determining a target socket that is needed to perform protocol processing on the first data packet, determining, according to an association between the target socket and the second protocol stack instance, the second protocol stack instance that is associated with the target socket, and performing protocol processing on the first data packet using the target socket and the second protocol stack instance, where the association between the target socket and the second protocol stack instance is determined when the first protocol stack instance and the second protocol stack instance perform protocol processing on a second data packet, the first protocol stack instance performs lower-layer protocol processing on the second data packet, the second protocol stack instance performs upper-layer protocol processing on the second data packet, and the lower-layer protocol processing and the upper-layer protocol processing jointly accomplish complete protocol processing on the second data packet.

In a first possible implementation manner of the second aspect, performing the protocol processing on the first data packet using the target socket and the second protocol stack instance includes adding the first data packet to an APP data sending queue of the target socket, and separately performing the lower-layer protocol processing and the upper-layer protocol processing on the first data packet in the APP data sending queue using the target socket and the second protocol stack instance when the APP data sending queue of the target socket is obtained by means of polling according to a protocol stack instance association linked list that corresponds to the second protocol stack instance, where the protocol stack instance association linked list that corresponds to the second protocol stack instance is used to indicate a socket that is associated with the second protocol stack instance.

In a second possible implementation manner of the second aspect, determining, according to an association between the target socket and the second protocol stack instance, the second protocol stack instance that is associated with the target socket includes determining, according to an affinity graph, whether a protocol stack instance associated with the target socket exists, where the affinity graph is used to record the protocol stack instance associated with the target socket, and determining the protocol stack instance associated with the target socket as the second protocol stack instance if the protocol stack instance associated with the target socket exists.

With reference to the second possible implementation manner of the second aspect, in a third possible implementation manner of the second aspect, the method further includes adding a control message to a receiving queue of a parent protocol stack instance of the target socket if the protocol stack instance associated with the target socket does not exist, where the parent protocol stack instance of the target socket is a protocol stack instance used to create the target socket, and the control message is used to instruct to perform protocol processing on the first data packet, parsing the control message to obtain the first data packet when the control message in the receiving queue of the parent protocol stack instance is obtained by means of polling, performing protocol processing on the first data packet using the parent protocol stack instance, and recording the parent protocol stack instance as the protocol stack instance that is recorded in the affinity graph and that is associated with the target socket.

With reference to the second aspect, the first possible implementation manner of the second aspect, the second possible implementation manner of the second aspect, and the third possible implementation manner of the second aspect, in a fourth possible implementation manner of the second aspect, determining a target socket that is needed to perform protocol processing on the first data packet includes searching a socket list to determine the target socket that is needed to perform protocol processing on the first data packet.

With reference to the third possible implementation manner of the second aspect, in a fifth possible implementation manner of the second aspect, before determining a target socket that is needed to perform protocol processing on the first data packet, the method further includes creating, using the parent protocol stack instance, the target socket that is not associated with any one of protocol stack instances included in the parallel protocol stack instances, where the parent protocol stack instance is selected from the protocol stack instances by the APP in a random manner, or in a parameter specifying manner, or in a load balancing manner.

With reference to the second aspect, the first possible implementation manner of the second aspect, the second possible implementation manner of the second aspect, and the third possible implementation manner of the second aspect, in a sixth possible implementation manner of the second aspect, after using the target socket and the second protocol stack instance to perform protocol processing on the first data packet, the method further includes adding, to a sending queue of a network adapter, the first data packet on which protocol processing has been performed such that the network adapter sends the first data packet on which protocol processing has been performed.

According to a third aspect, an apparatus for processing a data packet based on parallel protocol stack instances is provided, where the parallel protocol stack instances include at least a first protocol stack instance and a second protocol stack instance, and the apparatus includes a lower-layer protocol processing module configured to perform, using the first protocol stack instance, lower-layer protocol processing on a data packet that is distributed by a network adapter to the first protocol stack instance, a first determining module configured to determine a target socket that is needed to perform upper-layer protocol processing on the data packet on which the lower-layer protocol processing has been performed, a second determining module configured to determine, according to the target socket, the second protocol stack instance that is associated with the target socket, and an upper-layer protocol processing module configured to perform, using the target socket and the second protocol stack instance, the upper-layer protocol processing on the data packet on which the lower-layer protocol processing has been performed, where the lower-layer protocol processing module and the upper-layer protocol processing module jointly accomplish complete protocol processing on the data packet.

In a first possible implementation manner of the third aspect, the second determining module is configured to determine, according to affinity that is in an affinity graph and that is between the target socket and each protocol stack instance included in the parallel protocol stack instances, the second protocol stack instance that is associated with the target socket, where the affinity between the target socket and each protocol stack instance is used to indicate a quantity of data packets, on which the upper-layer protocol processing needs to be performed using the target socket, in data packets already distributed by the network adapter to each protocol stack instance.

With reference to the first possible implementation manner of the third aspect, in a second possible implementation manner of the third aspect, the apparatus further includes an updating module configured to update, according to a quantity of data packets on which the lower-layer protocol processing has been performed, affinity that is recorded in the affinity graph and that is between the target socket and the first protocol stack instance.

With reference to the second possible implementation manner of the third aspect, in a third possible implementation manner of the third aspect, the apparatus further includes a judging module configured to determine whether n×A is greater than B, where A is the affinity between the target socket and the first protocol stack instance, B is affinity that is recorded in the affinity graph and that is between the target socket and an associated protocol stack instance, and n is a preset coefficient, and the second determining module includes a first determining unit configured to determine that the protocol stack instance that is recorded in the affinity graph and that is associated with the target socket is used as the second protocol stack instance that is associated with the target socket if n×A is not greater than B.

With reference to the third possible implementation manner of the third aspect, in a fourth possible implementation manner of the third aspect, the second determining module includes a second determining unit configured to determine the first protocol stack instance as the second protocol stack instance that is associated with the target socket, and update the protocol stack instance that is recorded in the affinity graph and that is associated with the target socket to the first protocol stack instance if n×A is greater than B.

With reference to the third aspect, the first possible implementation manner of the third aspect, the second possible implementation manner of the third aspect, the third possible implementation manner of the third aspect, and the fourth possible implementation manner of the third aspect, in a fifth possible implementation manner of the third aspect, the first determining module is configured to search a socket list to obtain the target socket that is needed to perform the upper-layer protocol processing on the data packet on which the lower-layer protocol processing has been performed.

With reference to the third aspect, the first possible implementation manner of the third aspect, the second possible implementation manner of the third aspect, the third possible implementation manner of the third aspect, and the fourth possible implementation manner of the third aspect, in a sixth possible implementation manner of the third aspect, the upper-layer protocol processing module includes a queue unit configured to add, to a lower-layer data receiving queue of the target socket, the data packet on which the lower-layer protocol processing has been performed, and an upper-layer protocol processing unit configured to perform the upper-layer protocol processing on the data packet in the lower-layer data receiving queue using the second protocol stack instance when the target socket is obtained by means of polling according to a protocol stack instance association linked list that corresponds to the second protocol stack instance, where the protocol stack instance association linked list that corresponds to the second protocol stack instance is used to indicate a socket that is associated with the second protocol stack instance.

With reference to the third aspect, the first possible implementation manner of the third aspect, the second possible implementation manner of the third aspect, the third possible implementation manner of the third aspect, and the fourth possible implementation manner of the third aspect, in a seventh possible implementation manner of the third aspect, the apparatus further includes a creation module configured to create, using a parent protocol stack instance in protocol stack instances included in the parallel protocol stack instances, the target socket that is not associated with any one of the protocol stack instances, where the parent protocol stack instance is selected by an APP in a random manner, or in a parameter specifying manner, or in a load balancing manner.

With reference to the third aspect, the first possible implementation manner of the third aspect, the second possible implementation manner of the third aspect, the third possible implementation manner of the third aspect, and the fourth possible implementation manner of the third aspect, in an eighth possible implementation manner of the third aspect, the apparatus further includes a receiving module configured to receive a first data packet sent by an APP, where the first determining module is further configured to determine the target socket that is needed to perform protocol processing on the first data packet, and the second determining module is further configured to determine the second protocol stack instance that is associated with the target socket after the target socket that is needed to perform protocol processing on the first data packet is determined, and a protocol processing module configured to perform protocol processing on the first data packet using the target socket and the second protocol stack instance.

According to a fourth aspect, an apparatus for processing a data packet based on parallel protocol stack instances is provided, where the parallel protocol stack instances include at least a first protocol stack instance and a second protocol stack instance, and the apparatus includes a receiving module configured to receive a first data packet sent by an APP, a first determining module configured to determine a target socket that is needed to perform protocol processing on the first data packet, a second determining module configured to determine, according to an association between the target socket and the second protocol stack instance, the second protocol stack instance that is associated with the target socket, and a first processing module configured to perform protocol processing on the first data packet using the target socket and the second protocol stack instance, where the association between the target socket and the second protocol stack instance is determined when the first protocol stack instance and the second protocol stack instance perform protocol processing on a second data packet, the first protocol stack instance performs lower-layer protocol processing on the second data packet, the second protocol stack instance performs upper-layer protocol processing on the second data packet, and the lower-layer protocol processing and the upper-layer protocol processing jointly accomplish complete protocol processing on the second data packet.

In a first possible implementation manner of the fourth aspect, the first processing module includes a queue unit configured to add the first data packet to an APP data sending queue of the target socket, and a processing unit configured to separately perform the lower-layer protocol processing and the upper-layer protocol processing on the first data packet in the APP data sending queue using the target socket and the second protocol stack instance when the APP data sending queue of the target socket is obtained by means of polling according to a protocol stack instance association linked list that corresponds to the second protocol stack instance, where the protocol stack instance association linked list that corresponds to the second protocol stack instance is used to indicate a socket that is associated with the second protocol stack instance.

In a second possible implementation manner of the fourth aspect, the second determining module includes a judging unit configured to determine, according to an affinity graph, whether a protocol stack instance associated with the target socket exists, where the affinity graph is used to record the protocol stack instance associated with the target socket, and a determining unit configured to determine the protocol stack instance associated with the target socket as the second protocol stack instance if the protocol stack instance associated with the target socket exists.

With reference to the second possible implementation manner of the fourth aspect, in a third possible implementation manner of the fourth aspect, the apparatus further includes a queue module configured to add a control message to a receiving queue of a parent protocol stack instance of the target socket if the protocol stack instance associated with the target socket does not exist, where the parent protocol stack instance of the target socket is a protocol stack instance used to create the target socket, and the control message is used to instruct to perform protocol processing on the first data packet, a parsing module configured to parse the control message to obtain the first data packet when the control message in the receiving queue of the parent protocol stack instance is obtained by means of polling, a second processing module configured to perform protocol processing on the first data packet using the parent protocol stack instance, and an updating module configured to record the parent protocol stack instance as the protocol stack instance that is recorded in the affinity graph and that is associated with the target socket.

With reference to the fourth aspect, the first possible implementation manner of the fourth aspect, the second possible implementation manner of the fourth aspect, and the third possible implementation manner of the fourth aspect, in a fourth possible implementation manner of the fourth aspect, the first determining module is configured to search a socket list to determine the target socket that is needed to perform protocol processing on the first data packet.

With reference to the third possible implementation manner of the fourth aspect, in a fifth possible implementation manner of the fourth aspect, the apparatus further includes a creation module configured to create, using the parent protocol stack instance, the target socket that is not associated with any one of protocol stack instances included in the parallel protocol stack instances, where the parent protocol stack instance is selected from the protocol stack instances by the APP in a random manner, or in a parameter specifying manner, or in a load balancing manner.

With reference to the fourth aspect, the first possible implementation manner of the fourth aspect, the second possible implementation manner of the fourth aspect, and the third possible implementation manner of the fourth aspect, in a sixth possible implementation manner of the fourth aspect, the apparatus further includes a sending module configured to add, to a sending queue of a network adapter, the first data packet on which protocol processing has been performed such that the network adapter sends the first data packet on which protocol processing has been performed.

According to the method and the apparatus provided in the embodiments of the present disclosure, lower-layer protocol processing is performed, using a first protocol stack instance, on a data packet that is distributed to the first protocol stack instance. After a target socket that is needed to perform upper-layer protocol processing on the data packet on which the lower-layer protocol processing has been performed is determined, an associated second protocol stack instance is determined using the target socket, and the upper-layer protocol processing is performed, using the target socket and the second protocol stack instance, on the data packet on which the lower-layer protocol processing has been performed. A lower-layer protocol processing part and an upper-layer protocol processing part in protocol processing are separately completed by different protocol stack instances, and the second protocol stack instance that performs the upper-layer protocol processing is determined using the target socket. Therefore, a technical problem that protocol processing cannot be performed on a data packet because a protocol stack instance specified by an APP conflicts with a protocol stack instance specified by a network adapter is resolved.

BRIEF DESCRIPTION OF DRAWINGS

To describe the technical solutions in the embodiments of the present disclosure or in the prior art more clearly, the following briefly describes the accompanying drawings required for describing the embodiments or the prior art. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
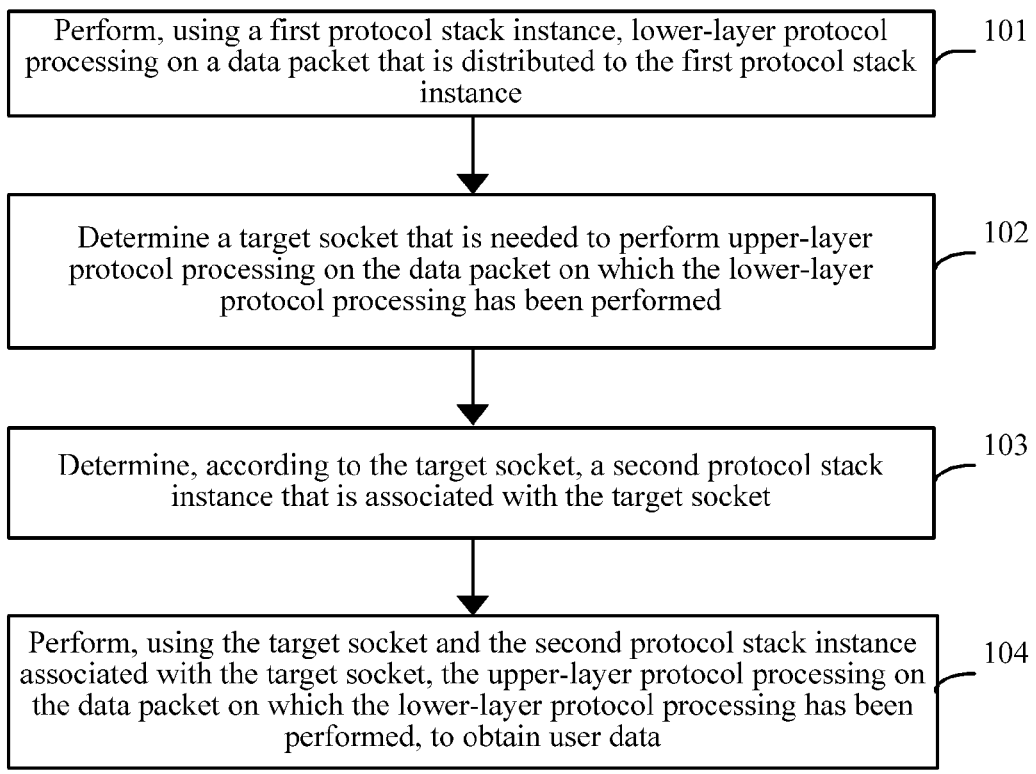
FIG. 1 is a schematic flowchart of a method for processing a data packet based on parallel protocol stack instances according to an embodiment of the present disclosure.

FIG. 1 is a schematic flowchart of a method for processing a data packet based on parallel protocol stack instances according to an embodiment of the present disclosure. The method provided in this embodiment is executed by parallel protocol stack instances, and the parallel protocol stack instances include at least a first protocol stack instance and a second protocol stack instance. As shown in FIG. 1, the method includes the following steps.

Step 101: Perform, using the first protocol stack instance, lower-layer protocol processing on a data packet that is distributed to the first protocol stack instance.

Optionally, a network adapter includes multiple physical queues, the data packet that is distributed to the first protocol stack instance is acquired from a physical queue that corresponds to the first protocol stack instance, and the lower-layer protocol processing is performed on the data packet using the first protocol stack instance. The lower-layer protocol processing may be protocol processing at layer 3 or a layer lower than layer 3 stipulated in open system interconnection (OSI).

Step 102: Determine a target socket that is needed to perform upper-layer protocol processing on the data packet on which the lower-layer protocol processing has been performed.

Optionally, a socket list is searched to obtain the target socket that is needed to perform the upper-layer protocol processing on the data packet. The upper-layer protocol processing may be protocol processing at layer 4 or a layer higher than layer 4 stipulated in the OSI. The socket list is used to record a correspondence between hash values of data packets and sockets, where the hash value may be quintuple information of a data packet. Therefore, the socket list may be searched according to a hash value of a data packet, to obtain a target socket that is needed to perform the upper-layer protocol processing on the data packet.

Step 103: Determine, according to the target socket, the second protocol stack instance that is associated with the target socket.

Optionally, the target socket that is not associated with any one of the protocol stack instances is created in advance using a parent protocol stack instance that is in protocol stack instances and that is used to initially establish the target socket, for example, the target socket is created in a shared area of a memory, where the parent protocol stack instance is selected by an APP in a random manner, or in a parameter specifying manner, or in a load balancing manner. The second protocol stack instance is determined in the protocol stack instances according to affinity between each protocol stack instance included in the parallel protocol stack instances and the target socket, or using a load balancing policy, or in a random manner, and an association between the target socket and the second protocol stack instance is established. Affinity between a protocol stack instance and the target socket is used to indicate a quantity of data packets, on which the upper-layer protocol processing needs to be performed using the target socket, in data packets already distributed by the network adapter to each protocol stack instance.

Step 104: Perform, using the target socket and the second protocol stack instance associated with the target socket, the upper-layer protocol processing on the data packet on which the lower-layer protocol processing has been performed, to obtain user data.

The lower-layer protocol processing and the upper-layer protocol processing jointly accomplish complete protocol processing on the data packet. For example, the lower-layer protocol processing completes protocol processing, on the data packet, at layer 3 or a layer lower than layer 3 stipulated in the OSI, the upper-layer protocol processing completes protocol processing at layer 4 or a layer higher than layer 4 stipulated in the OSI, and the lower-layer protocol processing and the upper-layer protocol processing jointly accomplish protocol processing, on the data packet, at seven layers stipulated in the OSI.

Optionally, the data packet on which the lower-layer protocol processing has been performed is added to a lower-layer data receiving queue of the target socket, and when the target socket is obtained by means of polling according to a protocol stack instance association linked list that corresponds to the second protocol stack instance, upper-layer protocol processing is performed on the data packet in the lower-layer data receiving queue using the second protocol stack instance, to obtain user data carried in the data packet. The protocol stack instance association linked list that corresponds to the second protocol stack instance is used to indicate a socket that is associated with the second protocol stack instance.

Further, the method for processing a data packet based on parallel protocol stack instances provided in this embodiment may further be used to receive a first data packet sent by the APP, thereby determining the target socket that is needed to perform protocol processing on the first data packet, determining the second protocol stack instance that is associated with the target socket, and further performing protocol processing on the first data packet using the target socket and the second protocol stack instance.

In this embodiment, lower-layer protocol processing is performed, using a first protocol stack instance, on a data packet that is distributed to the first protocol stack instance. After a target socket that is needed to perform upper-layer protocol processing on the data packet on which the lower-layer protocol processing has been performed is determined, an associated second protocol stack instance is determined using the target socket, and the upper-layer protocol processing is performed, using the target socket and the second protocol stack instance, on the data packet on which the lower-layer protocol processing has been performed. A lower-layer protocol processing part and an upper-layer protocol processing part in protocol processing are separately completed by different protocol stack instances, and the second protocol stack instance that performs the upper-layer protocol processing is determined using the target socket. Therefore, a technical problem that protocol processing cannot be performed on a data packet because a protocol stack instance specified by an APP conflicts with a protocol stack instance specified by a network adapter is resolved.

Figure 2:
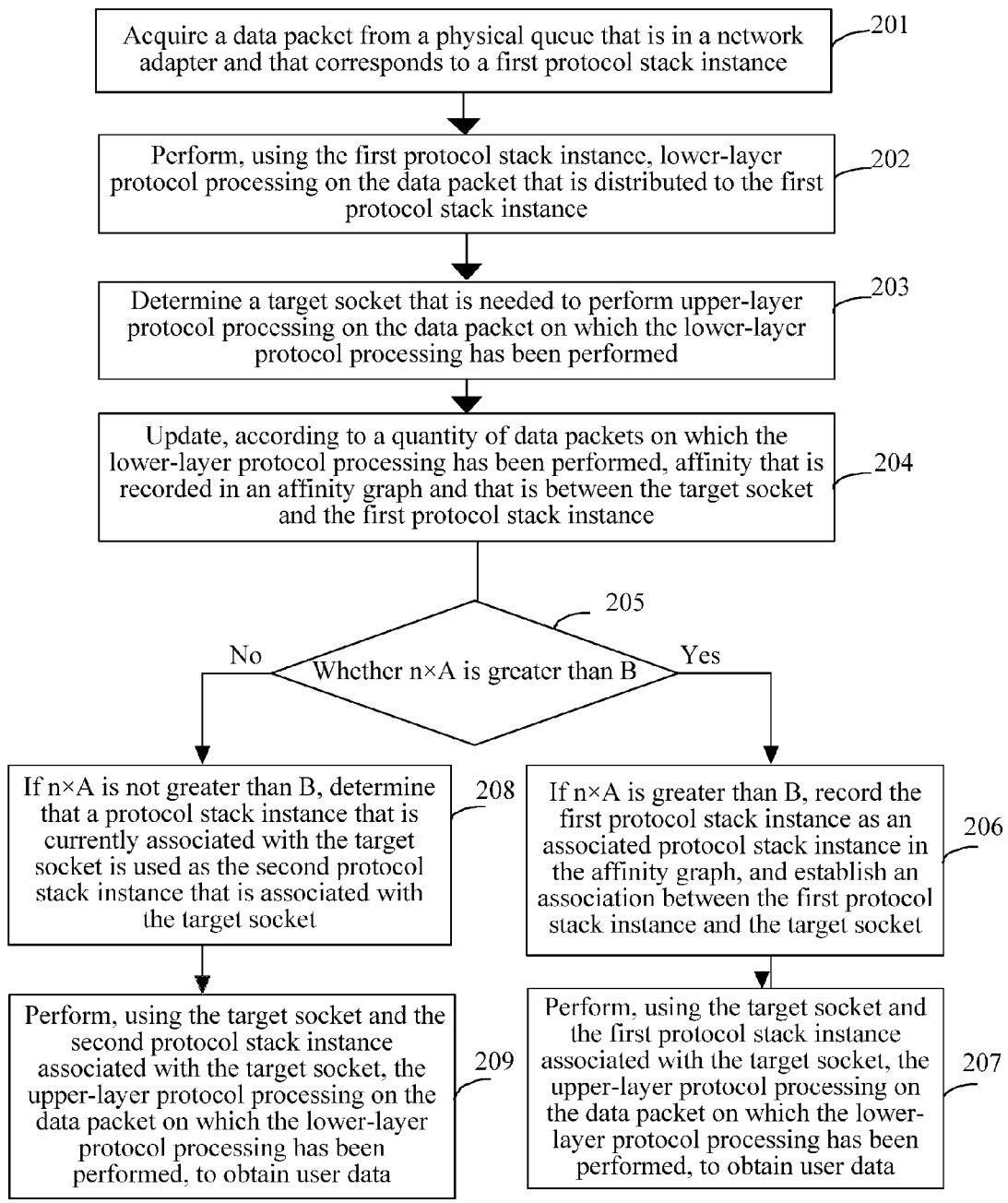
FIG. 2 is a schematic flowchart of another method for processing a data packet based on parallel protocol stack instances according to an embodiment of the present disclosure.

FIG. 2 is a schematic flowchart of another method for processing a data packet based on parallel protocol stack instances according to an embodiment of the present disclosure. The method provided in this embodiment is executed by parallel protocol stack instances, and as shown in FIG. 2, the method includes the following steps.

Step 201: Acquire a data packet from a physical queue that is in a network adapter and that corresponds to a first protocol stack instance.

Optionally, there is a correspondence between physical queues in the network adapter and protocol stack instances in the parallel protocol stack instances, where physical queues may one-to-one correspond to protocol stack instances, or multiple physical queues correspond to one protocol stack instance, which is not limited in this embodiment. The network adapter adds, to a physical queue corresponding to the first protocol stack instance, a data packet distributed to the first protocol stack instance, and the first protocol stack instance acquires the data packet from the physical queue.

Step 202: Perform, using the first protocol stack instance, lower-layer protocol processing on the data packet that is distributed to the first protocol stack instance.

Optionally, after the first protocol stack instance acquires the data packet from the physical queue of the network adapter, the lower-layer protocol processing, for example, protocol processing at layer 3 or a layer lower than layer 3 stipulated in OSI, is performed on the data packet using the first protocol stack instance.

Step 203: Determine a target socket that is needed to perform upper-layer protocol processing on the data packet on which the lower-layer protocol processing has been performed.

Optionally, a socket list is searched to obtain the target socket that is needed to perform the upper-layer protocol processing on the data packet. The upper-layer protocol may be protocol processing at layer 4 or a layer higher than layer 4 stipulated in the OSI.

Step 204: Update, according to a quantity of data packets on which the lower-layer protocol processing has been performed, affinity that is recorded in an affinity graph and that is between the target socket and the first protocol stack instance.

Affinity between a protocol stack instance and the target socket is used to indicate a quantity of data packets, on which the upper-layer protocol processing needs to be performed using the target socket, in data packets already distributed by the network adapter to the protocol stack instance. One socket may have multiple connections, and traffic of the multiple connections is also distributed to multiple protocol stack instances. If it is configured that a socket a needs to be processed by a protocol stack instance A, after a protocol stack instance B receives a data packet that needs to be processed using the socket a, the protocol stack instance B needs to forward the data packet to the protocol stack instance A for processing. If it is configured that the protocol stack instance B directly processes the socket a, the protocol stack instance B may directly obtain, from a cache, the data packet that needs to be processed using the socket a, and obviously, it is more efficient to select the protocol stack instance B to process the socket a. Therefore, it is considered that there is greater data affinity between the socket a and the protocol stack instance B, and consequently, traffic of the socket a is preferentially distributed to the protocol stack instance B for processing. That is, a protocol stack instance that has maximum affinity with a socket is selected to process the socket such that maximum traffic does not need to be forwarded, and maximum efficiency is ensured. The affinity graph of the target socket is used to record affinity between each protocol stack instance in the parallel protocol stack instance and the target socket, an associated protocol stack instance currently associated with the target socket, a parent protocol stack instance for creating the target socket, and a preset coefficient that corresponds to the target socket, and includes an affinity array, an identifier of the associated protocol stack instance, an identifier and a preset coefficient of the parent protocol stack instance. The affinity array is used to indicate affinity between each protocol stack instance in the parallel protocol stack instance and the target socket.

Optionally, after the first protocol stack instance performs the lower-layer protocol processing on the data packet, a quantity of obtained data packets on which the lower-layer protocol processing has been performed is counted, and the quantity obtained by counting is added to the affinity that is between the first protocol stack instance and the target socket and that is in the affinity array of the affinity graph.

For example, if the affinity between the first protocol stack instance and the target socket is X in the affinity array of the affinity graph, and the quantity, obtained by counting, of the data packets on which the lower-layer protocol processing has been performed is Y, the affinity between the first protocol stack instance and the target socket is updated to A=(X+Y) in the affinity array of the affinity graph.

Step 205: Determine whether n×A is greater than B, and perform steps 206 and 207 if n×A is greater than B, or perform steps 208 and 209 if n×A is not greater than B.

A is the affinity between the target socket and the first protocol stack instance, B is affinity between the target socket and a currently associated protocol stack instance, and n is a preset coefficient. A value range of n is positive numbers, and generally, a value of n is a positive number that is not greater than one, to reduce frequency at which a protocol stack instance associated with the target socket changes. On the contrary, if frequency at which a protocol stack instance associated with the target socket changes needs to be increased, the value of n may be greater than one, where the associated protocol stack instance is a protocol stack instance that is recorded in the affinity graph and that is currently associated with the target socket.

Step 206: If n×A is greater than B, record the first protocol stack instance as an associated protocol stack instance in the affinity graph, and establish an association between the first protocol stack instance and the target socket.

Optionally, if n×A is greater than B, it indicates that the associated protocol stack instance in the affinity graph needs to be replaced with the first protocol stack instance, and the association between the first protocol stack instance and the target socket is established.

Step 207: Perform, using the target socket and the first protocol stack instance associated with the target socket, the upper-layer protocol processing on the data packet on which the lower-layer protocol processing has been performed, to obtain user data.

Optionally, the first protocol stack instance continues to perform the upper-layer protocol processing on the data packet on which the lower-layer protocol processing has been performed, to obtain the user data carried in the data packet, the user data is added to an APP receiving queue of the target socket, and the user data is acquired from the queue when an APP polls the queue.

Step 208: If n×A is not greater than B, determine that a protocol stack instance that is currently associated with the target socket is used as the second protocol stack instance that is associated with the target socket.

Step 209: Perform, using the target socket and the second protocol stack instance associated with the target socket, the upper-layer protocol processing on the data packet on which the lower-layer protocol processing has been performed, to obtain user data.

Further, the user data is sent to the APP after the upper-layer protocol processing is performed in step 207 and step 209.

Optionally, the data packet on which the lower-layer protocol processing has been performed is added to a lower-layer data receiving queue of the target socket. The upper-layer protocol processing is performed on the data packet in the lower-layer data receiving queue using the second protocol stack instance when the target socket is obtained by means of polling according to a protocol stack instance association linked list that corresponds to the second protocol stack instance, where the protocol stack instance association linked list that corresponds to the second protocol stack instance is used to indicate a socket that is associated with the second protocol stack instance.

It should be noted that the lower-layer protocol processing and the upper-layer protocol processing jointly accomplish complete protocol processing on the data packet. For example, the lower-layer protocol processing completes protocol processing, on the data packet, at layer 3 or a layer lower than layer 3 stipulated in the OSI, the upper-layer protocol processing completes protocol processing at layer 4 or a layer higher than layer 4 stipulated in the OSI, and the lower-layer protocol processing and the upper-layer protocol processing jointly accomplish protocol processing, on the data packet, at seven layers stipulated in the OSI.

In this embodiment, lower-layer protocol processing is performed, using a first protocol stack instance, on a data packet that is distributed to the first protocol stack instance. After a target socket that is needed to perform upper-layer protocol processing on the data packet on which the lower-layer protocol processing has been performed is determined, an associated second protocol stack instance is determined using the target socket, and the upper-layer protocol processing is performed, using the target socket and the second protocol stack instance, on the data packet on which the lower-layer protocol processing has been performed. A lower-layer protocol processing part and an upper-layer protocol processing part in protocol processing are separately completed by different protocol stack instances, and the second protocol stack instance that performs the upper-layer protocol processing is determined using the target socket. Therefore, a technical problem that protocol processing cannot be performed on a data packet because a protocol stack instance specified by an APP conflicts with a protocol stack instance specified by a network adapter is resolved.

Figure 3:
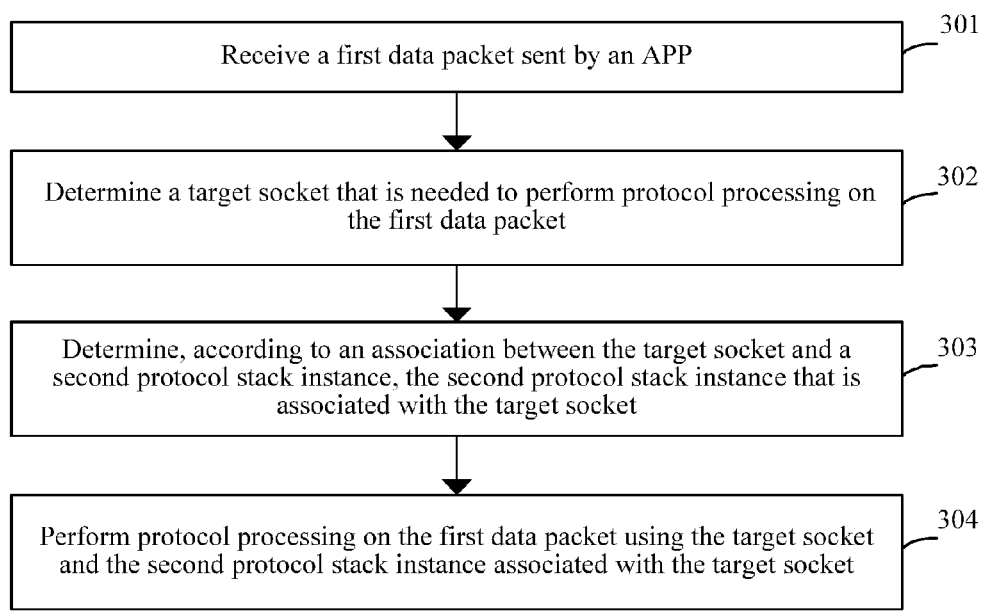
FIG. 3 is a schematic flowchart of a method for processing a data packet based on parallel protocol stack instances according to another embodiment of the present disclosure.

FIG. 3 is a schematic flowchart of a method for processing a data packet based on parallel protocol stack instances according to another embodiment of the present disclosure. The method provided in this embodiment is executed by parallel protocol stack instances, and the parallel protocol stack instances include at least a first protocol stack instance and a second protocol stack instance. As shown in FIG. 3, the method includes the following steps.

Step 301: Receive a first data packet sent by an APP.

Step 302: Determine a target socket that is needed to perform protocol processing on the first data packet.

Optionally, a socket list is searched to obtain the target socket that is needed to perform protocol processing on the first data packet. The target socket is a socket that is created using a parent protocol stack instance in protocol stack instances and that is not associated with any one of the protocol stack instances, where the parent protocol stack instance is selected by the APP in a random manner, or in a parameter specifying manner, or in a load balancing manner.

Step 303: Determine, according to an association between the target socket and a second protocol stack instance, the second protocol stack instance that is associated with the target socket.

The association between the target socket and the second protocol stack instance is determined when the first protocol stack instance and the second protocol stack instance perform protocol processing on a second data packet, the first protocol stack instance performs lower-layer protocol processing on the second data packet, the second protocol stack instance performs upper-layer protocol processing on the second data packet, and the lower-layer protocol processing and the upper-layer protocol processing jointly accomplish complete protocol processing on the second data packet.

Step 304: Perform protocol processing on the first data packet using the target socket and the second protocol stack instance associated with the target socket.

It should be noted that the lower-layer protocol processing and the upper-layer protocol processing jointly accomplish complete protocol processing on the data packet. For example, the lower-layer protocol processing completes protocol processing, on the data packet, at layer 3 or a layer lower than layer 3 stipulated in OSI, the upper-layer protocol processing completes protocol processing at layer 4 or a layer higher than layer 4 stipulated in the OSI, and the lower-layer protocol processing and the upper-layer protocol processing jointly accomplish protocol processing, on the data packet, at seven layers stipulated in the OSI.

For a method for determining the second protocol stack instance in this embodiment, reference may be made to the method for determining the second protocol stack instance in the foregoing embodiment, and details are not described again in this embodiment.

In this embodiment, lower-layer protocol processing is performed, using a first protocol stack instance, on a data packet that is distributed to the first protocol stack instance, after a target socket that is needed to perform upper-layer protocol processing on the data packet on which the lower-layer protocol processing has been performed is determined, an associated second protocol stack instance is determined using the target socket, and the upper-layer protocol processing is performed, using the target socket and the second protocol stack instance, on the data packet on which the lower-layer protocol processing has been performed. A lower-layer protocol processing part and an upper-layer protocol processing part in protocol processing are separately completed by different protocol stack instances, and the second protocol stack instance that performs the upper-layer protocol processing is determined using the target socket. Therefore, a technical problem that protocol processing cannot be performed on a data packet because a protocol stack instance specified by an APP conflicts with a protocol stack instance specified by a network adapter is resolved.

Figure 4:
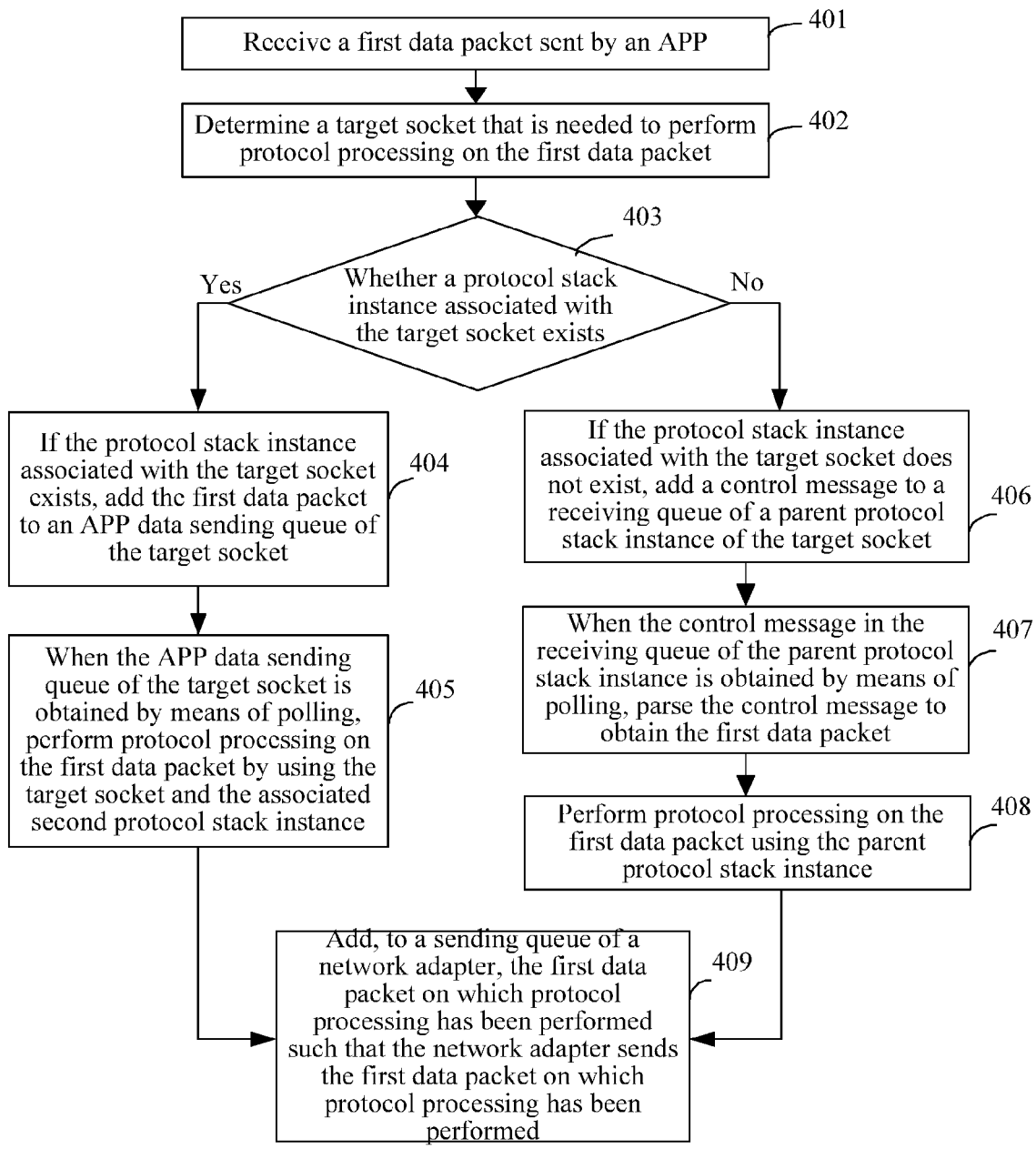
FIG. 4 is a schematic flowchart of another method for processing a data packet based on parallel protocol stack instances according to another embodiment of the present disclosure.

FIG. 4 is a schematic flowchart of another method for processing a data packet based on parallel protocol stack instances according to another embodiment of the present disclosure. The method provided in this embodiment is executed by parallel protocol stack instances, and the parallel protocol stack instances include at least a first protocol stack instance and a second protocol stack instance. As shown in FIG. 4, the method includes the following steps.

Step 401: Receive a first data packet sent by an APP.

Step 402: Determine a target socket that is needed to perform protocol processing on the first data packet.

Optionally, a socket list is searched to determine the target socket that is needed to perform protocol processing on the first data packet.

Further, before step 402, the method includes creating, using a parent protocol stack instance that is in the parallel protocol stack instances and that is used to initially establish the target socket, the target socket that is not associated with any one of the protocol stack instances included in the parallel protocol stack instances, where the parent protocol stack instance is selected in a random manner, or in a parameter specifying manner, or in a load balancing manner by the APP from the protocol stack instances included in the parallel protocol stack instances.

Step 403: Determine, according to an affinity graph, whether a protocol stack instance associated with the target socket exists, and perform steps 404 and 405 if the protocol stack instance associated with the target socket exists, or perform steps 406 to 408 if the protocol stack instance associated with the target socket does not exist.

The affinity graph is used to record a protocol stack instance currently associated with the target socket, and the associated protocol stack instance recorded in the affinity graph is a protocol stack instance currently associated with the target socket. The association is determined in the protocol stack instances according to affinity between each protocol stack instance included in the parallel protocol stack instances and the target socket, and subsequently, the association between the target socket and the second protocol stack instance is established. Affinity between a protocol stack instance and the target socket is used to indicate a quantity of data packets, on which the upper-layer protocol processing needs to be performed using the target socket, in data packets already distributed by the network adapter to the protocol stack instance.

Step 404: If the protocol stack instance associated with the target socket exists, add the first data packet to an APP data sending queue of the target socket.

Optionally, the target socket includes the APP data sending queue, an APP data receiving queue, and a lower-layer data receiving queue. The APP data sending queue is used to store a data packet sent by the APP, the APP data receiving queue is used to store a data packet sent to the APP, and the lower-layer data receiving queue is used to store a data packet distributed by the network adapter.

Step 405: When the APP data sending queue of the target socket is obtained by means of polling, perform protocol processing on the first data packet using the target socket and the associated second protocol stack instance.

Optionally, when the APP data sending queue of the target socket is obtained by means of polling according to a protocol stack instance association linked list that corresponds to the second protocol stack instance, the lower-layer protocol processing and the upper-layer protocol processing are performed separately on the first data packet in the APP data sending queue using the target socket and the second protocol stack instance.

The protocol stack instance association linked list that corresponds to the second protocol stack instance is used to indicate a socket that is associated with the second protocol stack instance.

It should be noted that the lower-layer protocol processing and the upper-layer protocol processing jointly accomplish complete protocol processing on the data packet. For example, the lower-layer protocol processing completes protocol processing, on the data packet, at layer 3 or a layer lower than layer 3 stipulated in OSI, the upper-layer protocol processing completes protocol processing at layer 4 or a layer higher than layer 4 stipulated in the OSI, and the lower-layer protocol processing and the upper-layer protocol processing jointly accomplish protocol processing, on the data packet, at seven layers stipulated in the OSI.

Step 406: If the protocol stack instance associated with the target socket does not exist, add a control message to a receiving queue of a parent protocol stack instance of the target socket.

The parent protocol stack instance of the target socket is a protocol stack instance used to create the target socket, and the control message is used to instruct to perform protocol processing on the first data packet. The receiving queue of the parent protocol stack instance is used to store a data packet that needs to be processed using the parent protocol stack instance, or store the control message.

Step 407: When the control message in the receiving queue of the parent protocol stack instance is obtained by means of polling, parse the control message to obtain the first data packet.

Optionally, polling is performed on receiving queues of protocol stack instances, and the control message is acquired from the queue, and the control message is parsed to obtain the first data packet when the receiving queue of the parent protocol stack is obtained by means of polling.

Step 408: Perform protocol processing on the first data packet using the parent protocol stack instance.

Step 409: Add, to a sending queue of a network adapter, the first data packet on which protocol processing has been performed such that the network adapter sends the first data packet on which protocol processing has been performed.

In this embodiment, lower-layer protocol processing is performed, using a first protocol stack instance, on a data packet that is distributed to the first protocol stack instance. After a target socket that is needed to perform upper-layer protocol processing on the data packet on which the lower-layer protocol processing has been performed is determined, an associated second protocol stack instance is determined using the target socket, and the upper-layer protocol processing is performed, using the target socket and the second protocol stack instance, on the data packet on which the lower-layer protocol processing has been performed, to obtain user data. A lower-layer protocol processing part and an upper-layer protocol processing part in protocol processing are separately completed by different protocol stack instances, and the second protocol stack instance that performs the upper-layer protocol processing is determined using the target socket. Therefore, a technical problem that protocol processing cannot be performed on a data packet because a protocol stack instance specified by an APP conflicts with a protocol stack instance specified by a network adapter is resolved.

Figure 5:
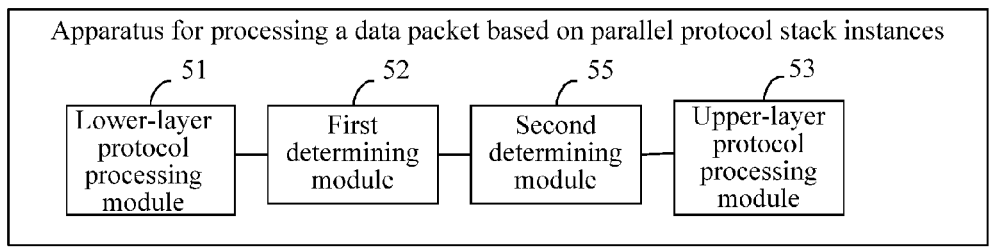
FIG. 5 is a schematic structural diagram of an apparatus for processing a data packet based on parallel protocol stack instances according to an embodiment of the present disclosure.

FIG. 5 is a schematic structural diagram of an apparatus for processing a data packet based on parallel protocol stack instances according to an embodiment of the present disclosure, where the parallel protocol stack instances include at least a first protocol stack instance and a second protocol stack instance. As shown in FIG. 5, the apparatus for processing a data packet based on parallel protocol stack instances includes a lower-layer protocol processing module 51, a first determining module 52, a second determining module 55, and an upper-layer protocol processing module 53.

The lower-layer protocol processing module 51 is configured to perform, using the first protocol stack instance, lower-layer protocol processing on a data packet that is distributed by a network adapter to the first protocol stack instance.

The first determining module 52 is connected to the lower-layer protocol processing module 51, and is configured to determine a target socket that is needed to perform upper-layer protocol processing on the data packet on which the lower-layer protocol processing has been performed.

Optionally, the first determining module 52 is configured to search a socket list to determine the target socket that is needed to perform the upper-layer protocol processing on the data packet.

The second determining module 55 is connected to the first determining module 52, and is configured to determine, according to the target socket, the second protocol stack instance that is associated with the target socket.

Optionally, the second determining module 55 is configured to determine, according to affinity that is in an affinity graph and that is between the target socket and each protocol stack instance included in the parallel protocol stack instances, the second protocol stack instance that is associated with the target socket, where the affinity between the target socket and each protocol stack instance is used to indicate a quantity of data packets, on which the upper-layer protocol processing needs to be performed using the target socket, in data packets already distributed by the network adapter to the protocol stack instance.

The upper-layer protocol processing module 53 is connected to the second determining module 55, and is configured to perform, using the target socket and the second protocol stack instance associated with the target socket, upper-layer protocol processing on the data packet on which the lower-layer protocol processing has been performed.

The lower-layer protocol processing module 51 and the upper-layer protocol processing module 53 jointly accomplish complete protocol processing on the data packet.

It should be noted that the lower-layer protocol processing and the upper-layer protocol processing jointly accomplish complete protocol processing on the data packet. For example, the lower-layer protocol processing completes protocol processing, on the data packet, at layer 3 or a layer lower than layer 3 stipulated in OSI, the upper-layer protocol processing completes protocol processing at layer 4 or a layer higher than layer 4 stipulated in the OSI, and the lower-layer protocol processing and the upper-layer protocol processing jointly accomplish protocol processing of the data packet at seven layers stipulated in the OSI.

Optionally, the upper-layer protocol processing module 53 is configured to add, to a lower-layer data receiving queue of the target socket, the data packet on which the lower-layer protocol processing has been performed, and perform the upper-layer protocol processing on the data packet in the lower-layer data receiving queue using the second protocol stack instance when the target socket is obtained by means of polling according to a protocol stack instance association linked list that corresponds to the second protocol stack instance, where the protocol stack instance association linked list that corresponds to the second protocol stack instance is used to indicate a socket that is associated with the second protocol stack instance.

In this embodiment, lower-layer protocol processing is performed, using a first protocol stack instance, on a data packet that is distributed to the first protocol stack instance. After a target socket that is needed to perform upper-layer protocol processing on the data packet on which the lower-layer protocol processing has been performed is determined, an associated second protocol stack instance is determined using the target socket, and the upper-layer protocol processing is performed, using the target socket and the second protocol stack instance, on the data packet on which the lower-layer protocol processing has been performed. A lower-layer protocol processing part and an upper-layer protocol processing part in protocol processing are separately completed by different protocol stack instances, and the second protocol stack instance that performs the upper-layer protocol processing is determined using the target socket. Therefore, a technical problem that protocol processing cannot be performed on a data packet because a protocol stack instance specified by an APP conflicts with a protocol stack instance specified by a network adapter is resolved.

Figure 6:
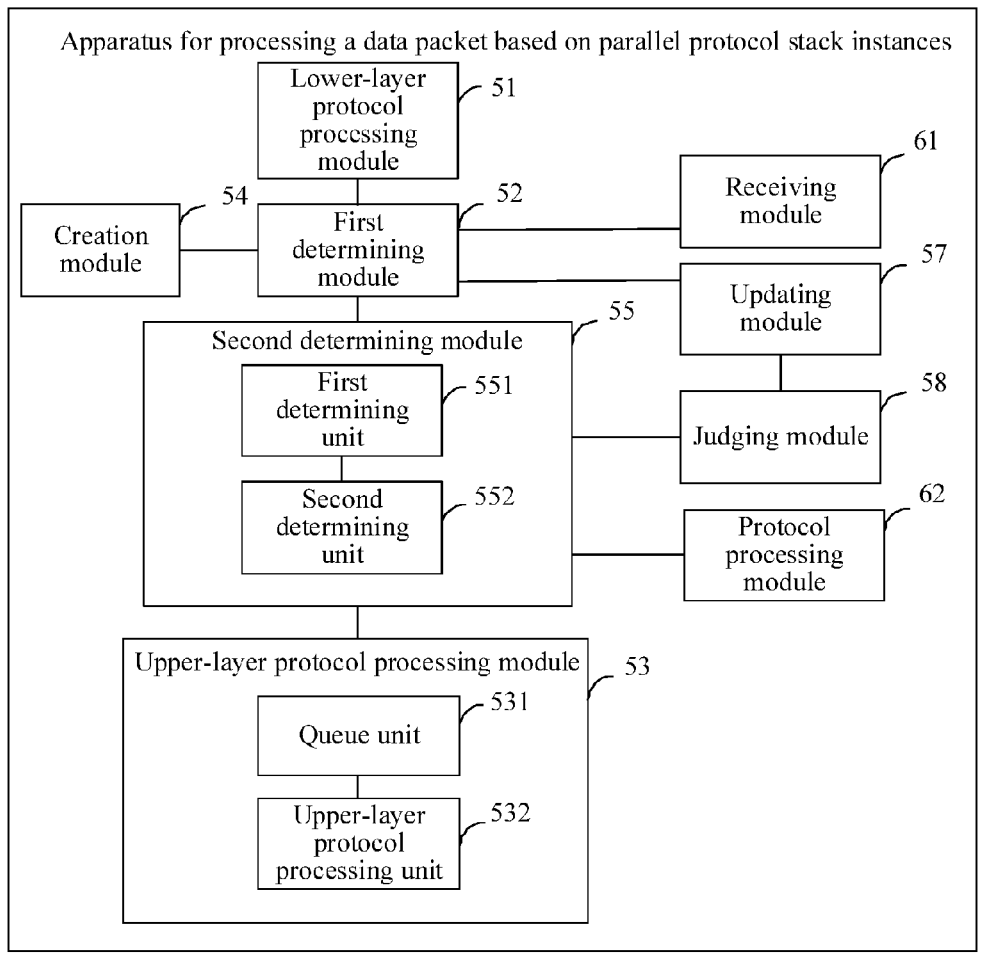
FIG. 6 is a schematic structural diagram of another apparatus for processing a data packet based on parallel protocol stack instances according to an embodiment of the present disclosure.

FIG. 6 is a schematic structural diagram of another apparatus for processing a data packet based on parallel protocol stack instances according to an embodiment of the present disclosure, where the parallel protocol stack instances include at least a first protocol stack instance and a second protocol stack instance. As shown in FIG. 6, based on the foregoing embodiment, the apparatus for processing a data packet based on parallel protocol stack instances in this embodiment further includes a creation module 54 connected to the first determining module 52, and configured to create, using a parent protocol stack instance in protocol stack instances included in the parallel protocol stack instances, the target socket that is not associated with any one of the protocol stack instances.

The parent protocol stack instance is selected by an APP in a random manner, or in a parameter specifying manner, or in a load balancing manner.

The apparatus for processing a data packet based on parallel protocol stack instances further includes an updating module 57 connected to the first determining module 52, and configured to update, according to a quantity of data packets on which the lower-layer protocol processing has been performed, affinity that is recorded in the affinity graph and that is between the target socket and the first protocol stack instance, and a judging module 58 connected to the updating module 57 and the second determining module 55, and configured to determine whether n×A is greater than B, where A is the affinity between the target socket and the first protocol stack instance, B is affinity that is recorded in the affinity graph and that is between the target socket and an associated protocol stack instance, n is a preset coefficient, and a value of n is a positive number. For a specific value of n, reference may be made to processing performance of a CPU that runs the parallel protocol stack instances, the value of n may be correspondingly relatively small if the processing performance of the CPU is excellent, or the value of n is relatively large if the processing performance of the CPU is not excellent. The associated protocol stack instance recorded in the affinity graph is a protocol stack instance currently associated with the target socket.

On this basis, the second determining module 55 further includes a first determining unit 551 and a second determining unit 552.

The first determining unit 551 is configured to determine that the protocol stack instance that is recorded in the affinity graph and that is associated with the target socket is used as the second protocol stack instance that is associated with the target socket if n×A is not greater than B.

The second determining unit 552 is configured to determine the first protocol stack instance as the second protocol stack instance that is associated with the target socket, and update the protocol stack instance that is recorded in the affinity graph and that is associated with the target socket to the first protocol stack instance if n×A is greater than B.

Further, the upper-layer protocol processing module 53 includes a queue unit 531 configured to add, to a lower-layer data receiving queue of the target socket, the data packet on which the lower-layer protocol processing has been performed, and an upper-layer protocol processing unit 532 connected to the queue unit 531, and configured to perform the upper-layer protocol processing on the data packet in the lower-layer data receiving queue using the second protocol stack instance when the target socket is obtained by means of polling according to a protocol stack instance association linked list that corresponds to the second protocol stack instance, where the protocol stack instance association linked list that corresponds to the second protocol stack instance is used to indicate a socket that is associated with the second protocol stack instance.

The apparatus for processing a data packet based on parallel protocol stack instances provided in this embodiment may be disposed in parallel protocol stacks. As an implementable manner, the lower-layer protocol processing module 51, the first determining module 52, the second determining module 55, the updating module 57, and the judging module 58 may be disposed in the first protocol stack instance, and the queue unit 531 in the upper-layer protocol processing module 53 may be disposed in the first protocol stack instance, and the upper-layer protocol processing unit 532 in the upper-layer protocol processing module 53 may be disposed in the second protocol stack instance.

The apparatus for processing a data packet based on parallel protocol stack instances further includes a receiving module 61 and a protocol processing module 62.

The receiving module 61 is connected to the first determining module 52, and is configured to receive a first data packet sent by an APP.

The first determining module 52 is further configured to determine the target socket that is needed to perform protocol processing on the first data packet.

The second determining module 55 is further configured to determine the second protocol stack instance that is associated with the target socket after the target socket that is needed to perform protocol processing on the first data packet is determined.

The protocol processing module 62 is connected to the second determining module 55, and is configured to perform protocol processing on the first data packet using the target socket and the second protocol stack instance.

It should be noted that the lower-layer protocol processing and the upper-layer protocol processing jointly accomplish complete protocol processing on the data packet. For example, the lower-layer protocol processing completes protocol processing, on the data packet, at layer 3 or a layer lower than layer 3 stipulated in OSI, the upper-layer protocol processing completes protocol processing at layer 4 or a layer higher than layer 4 stipulated in the OSI, and the lower-layer protocol processing and the upper-layer protocol processing jointly accomplish protocol processing, on the data packet, at seven layers stipulated in the OSI.

The functional modules of the apparatus for processing a data packet based on parallel protocol stack instances provided in this embodiment may be configured to execute the procedures of the methods for processing a data packet based on parallel protocol stack instances shown in FIG. 1 and FIG. 2. A specific working principle thereof is not described in detail again, and for details, refer to the description in the method embodiments.

In this embodiment, lower-layer protocol processing is performed, using a first protocol stack instance, on a data packet that is distributed to the first protocol stack instance. After a target socket that is needed to perform upper-layer protocol processing on the data packet on which the lower-layer protocol processing has been performed is determined, an associated second protocol stack instance is determined using the target socket, and the upper-layer protocol processing is performed, using the target socket and the second protocol stack instance, on the data packet on which the lower-layer protocol processing has been performed. A lower-layer protocol processing part and an upper-layer protocol processing part in protocol processing are separately completed by different protocol stack instances, and the second protocol stack instance that performs the upper-layer protocol processing is determined using the target socket. Therefore, a technical problem that protocol processing cannot be performed on a data packet because a protocol stack instance specified by an APP conflicts with a protocol stack instance specified by a network adapter is resolved.

Figure 7:
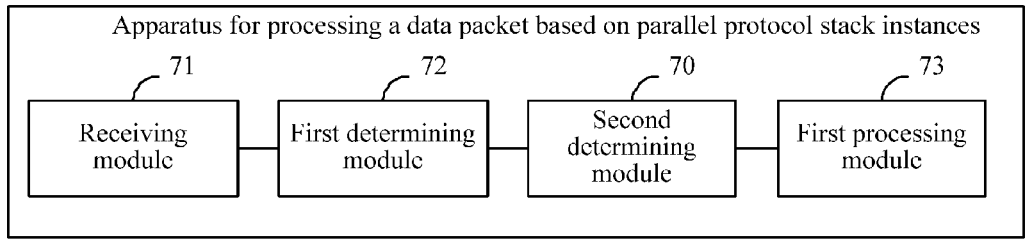
FIG. 7 is a schematic structural diagram of an apparatus for processing a data packet based on parallel protocol stack instances according to another embodiment of the present disclosure.

FIG. 7 is a schematic structural diagram of an apparatus for processing a data packet based on parallel protocol stack instances according to another embodiment of the present disclosure, where the parallel protocol stack instances include at least a first protocol stack instance and a second protocol stack instance. As shown in FIG. 7, the apparatus for processing a data packet based on parallel protocol stack instances includes a receiving module 71, a first determining module 72, a first processing module 73, and a second determining module 70.

The receiving module 71 is configured to receive a first data packet sent by an APP.

The first determining module 72 is connected to the receiving module 71, and is configured to determine a target socket that is needed to perform protocol processing on the first data packet.

Optionally, the first determining module 72 is configured to search a socket list to obtain the target socket that is needed to perform protocol processing on the first data packet.

The second determining module 70 is connected to the first determining module 72, and is configured to determine, according to an association between the target socket and the second protocol stack instance, the second protocol stack instance that is associated with the target socket.

The first processing module 73 is connected to the second determining module 70, and is configured to perform protocol processing on the first data packet using the target socket and the second protocol stack instance.

The association between the target socket and the second protocol stack instance is determined when the first protocol stack instance and the second protocol stack instance perform protocol processing on a second data packet, the first protocol stack instance performs lower-layer protocol processing on the second data packet, the second protocol stack instance performs upper-layer protocol processing on the second data packet, and the lower-layer protocol processing and the upper-layer protocol processing jointly accomplish complete protocol processing on the second data packet.

It should be noted that the lower-layer protocol processing and the upper-layer protocol processing jointly accomplish complete protocol processing on the data packet. For example, the lower-layer protocol processing completes protocol processing, on the data packet, at layer 3 or a layer lower than layer 3 stipulated in OSI, the upper-layer protocol processing completes protocol processing at layer 4 or a layer higher than layer 4 stipulated in the OSI, and the lower-layer protocol processing and the upper-layer protocol processing jointly accomplish protocol processing, on the data packet, at seven layers stipulated in the OSI.

In this embodiment, lower-layer protocol processing is performed, using a first protocol stack instance, on a data packet that is distributed to the first protocol stack instance. An associated second protocol stack instance is determined using the target socket after a target socket that is needed to perform upper-layer protocol processing on the data packet on which the lower-layer protocol processing has been performed is determined, and the upper-layer protocol processing is performed, using the target socket and the second protocol stack instance, on the data packet on which the lower-layer protocol processing has been performed. A lower-layer protocol processing part and an upper-layer protocol processing part in protocol processing are separately completed by different protocol stack instances, and the second protocol stack instance that performs the upper-layer protocol processing is determined using the target socket. Therefore, a technical problem that protocol processing cannot be performed on a data packet because a protocol stack instance specified by an APP conflicts with a protocol stack instance specified by a network adapter is resolved.

Figure 8:
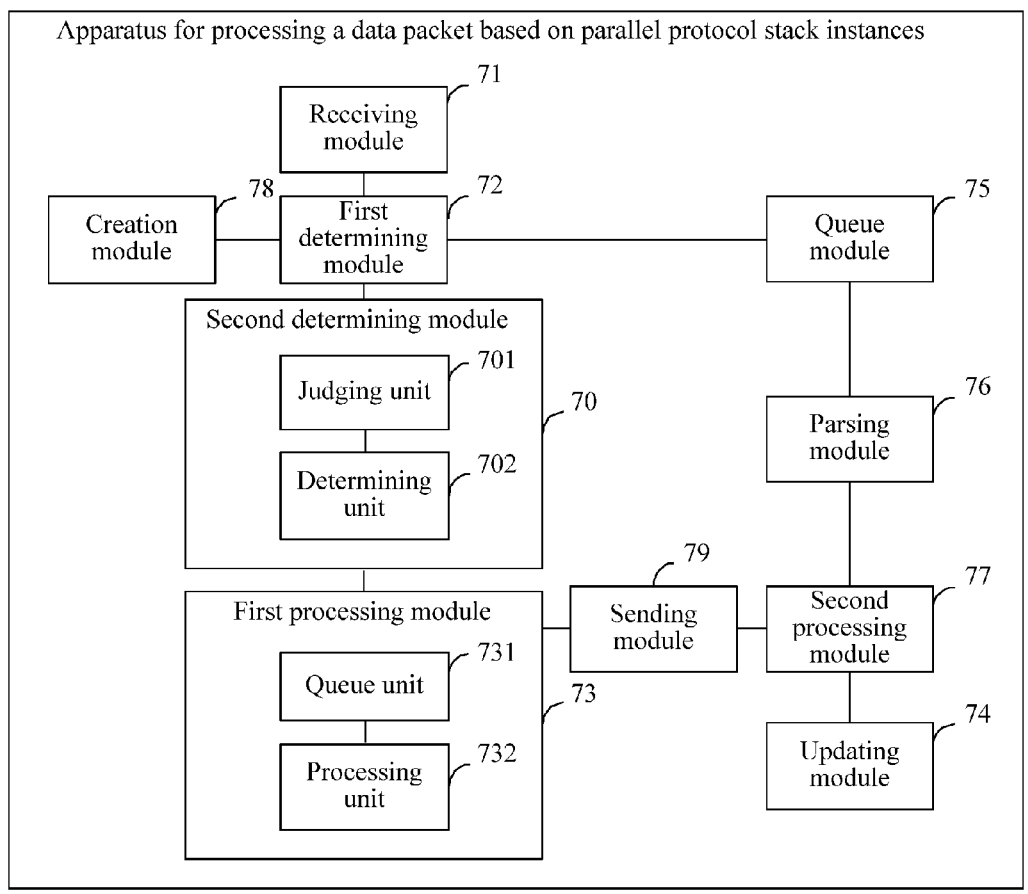
FIG. 8 is a schematic structural diagram of another apparatus for processing a data packet based on parallel protocol stack instances according to another embodiment of the present disclosure.

FIG. 8 is a schematic structural diagram of another apparatus for processing a data packet based on parallel protocol stack instances according to another embodiment of the present disclosure, where the parallel protocol stack instances include at least a first protocol stack instance and a second protocol stack instance. As shown in FIG. 8, based on the foregoing embodiment, the second determining module 70 in the apparatus for processing a data packet based on parallel protocol stack instances in this embodiment further includes a judging unit 701 configured to determine, according to an affinity graph, whether a protocol stack instance associated with the target socket exists, where the affinity graph is used to record a protocol stack instance currently associated with the target socket, and the associated protocol stack instance in the affinity graph is used to indicate a protocol stack instance currently associated with the target socket, and a determining unit 702 connected to the judging unit 701, and configured to determine the protocol stack instance associated with the target socket as the second protocol stack instance if the protocol stack instance associated with the target socket exists.

Further, the first processing module 73 includes a queue unit 731 and a processing unit 732.

The queue unit 731 is configured to add the first data packet to an APP data sending queue of the target socket.

The processing unit 732 is connected to the queue unit 731, and is configured to separately perform the lower-layer protocol processing and the upper-layer protocol processing on the first data packet in the APP data sending queue using the target socket and the second protocol stack instance when the APP data sending queue of the target socket is obtained by means of polling according to a protocol stack instance association linked list that corresponds to the second protocol stack instance, where the protocol stack instance association linked list that corresponds to the second protocol stack instance is used to indicate a socket that is associated with the second protocol stack instance.

The apparatus for processing a data packet based on parallel protocol stack instances further includes a creation module 78, a queue module 75, a parsing module 76, a second processing module 77, and an updating module 74.

The creation module 78 is connected to the first determining module 72, and is configured to create, using a parent protocol stack instance, the target socket that is not associated with any one of protocol stack instances included in the parallel protocol stack instances.

The parent protocol stack instance is selected from the protocol stack instances by an APP in a random manner, or in a parameter specifying manner, or in a load balancing manner.

The queue module 75 is connected to the first determining module 72, and is configured to add a control message to a receiving queue of a parent protocol stack instance of the target socket if the protocol stack instance associated with the target socket does not exist, where the parent protocol stack instance of the target socket is a protocol stack instance used to create the target socket, and the control message is used to instruct to perform protocol processing on the first data packet.

The parsing module 76 is connected to the queue module 75, and is configured to parse the control message to obtain the first data packet when the control message in the receiving queue of the parent protocol stack instance is obtained by means of polling.

The second processing module 77 is connected to the parsing module 76, and is configured to perform protocol processing on the first data packet using the parent protocol stack instance.

It should be noted that the lower-layer protocol processing and the upper-layer protocol processing jointly accomplish complete protocol processing on the data packet. For example, the lower-layer protocol processing completes protocol processing, on the data packet, at layer 3 or a layer lower than layer 3 stipulated in OSI, the upper-layer protocol processing completes protocol processing at layer 4 or a layer higher than layer 4 stipulated in the OSI, and the lower-layer protocol processing and the upper-layer protocol processing jointly accomplish protocol processing, on the data packet, at seven layers stipulated in the OSI. That is, a network level corresponding to the upper-layer protocol processing is higher than a network level corresponding to the lower-layer protocol processing.

The updating module 74 is connected to the second processing module 77, and is configured to record the parent protocol stack instance as the protocol stack instance that is recorded in the affinity graph and that is associated with the target socket.

Further, the apparatus for processing a data packet based on parallel protocol stack instances further includes a sending module 79 connected to the second processing module 77 and the first processing module 73, and configured to add, to a sending queue of a network adapter, the first data packet on which protocol processing has been performed such that the network adapter sends the first data packet on which protocol processing has been performed.

The functional modules of the apparatus for processing a data packet based on parallel protocol stack instances provided in this embodiment may be configured to execute the procedures of the methods for processing a data packet based on parallel protocol stack instances shown in FIG. 3 and FIG. 4. A specific working principle thereof is not described in detail again, and for details, refer to the description in the method embodiments.

In this embodiment, lower-layer protocol processing is performed, using a first protocol stack instance, on a data packet that is distributed to the first protocol stack instance. An associated second protocol stack instance is determined using the target socket after a target socket that is needed to perform upper-layer protocol processing on the data packet on which the lower-layer protocol processing has been performed is determined, and the upper-layer protocol processing is performed, using the target socket and the second protocol stack instance, on the data packet on which the lower-layer protocol processing has been performed. A lower-layer protocol processing part and an upper-layer protocol processing part in protocol processing are separately completed by different protocol stack instances, and the second protocol stack instance that performs the upper-layer protocol processing is determined using the target socket. Therefore, a technical problem that protocol processing cannot be performed on a data packet because a protocol stack instance specified by an APP conflicts with a protocol stack instance specified by a network adapter is resolved.

Figure 9:
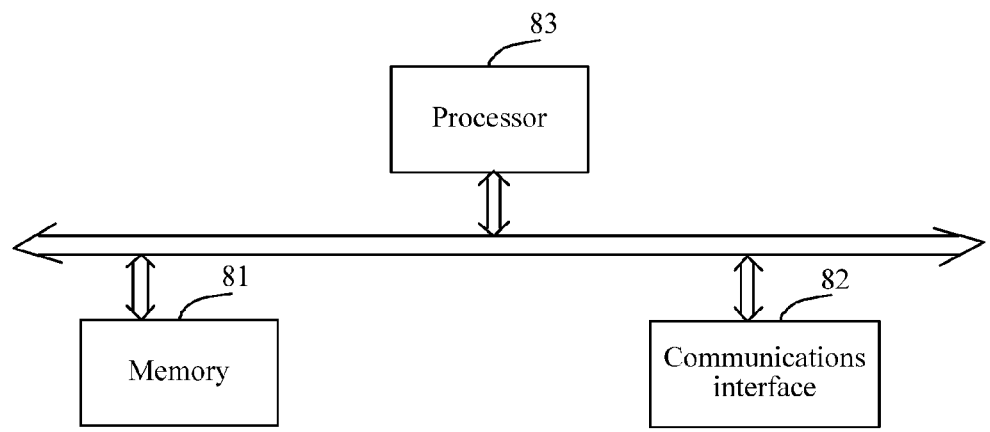
FIG. 9 is a schematic structural diagram of an apparatus for processing a data packet based on parallel protocol stack instances according to still another embodiment of the present disclosure.

FIG. 9 is a schematic structural diagram of an apparatus for processing a data packet based on parallel protocol stack instances according to still another embodiment of the present disclosure. As shown in FIG. 9, the apparatus in this embodiment may include a memory 81, a communications interface 82, and a processor 83.

The memory 81 is configured to store a program. The program may include program code, and the program code includes a computer operation instruction. The memory 81 may include a high-speed random-access memory (RAM), and may further include a non-volatile memory, for example, at least one magnetic disk storage.

The communications interface 82 is configured to receive a data packet distributed to a first protocol stack instance.

The processor 83 is configured to execute the program stored in the memory 81 in order to perform, using the first protocol stack instance, lower-layer protocol processing on a data packet that is distributed by a network adapter to the first protocol stack instance, determine a target socket that is needed to perform upper-layer protocol processing on the data packet on which the lower-layer protocol processing has been performed, determine, according to the target socket, a second protocol stack instance that is associated with the target socket, and perform, using the target socket and the second protocol stack instance, the upper-layer protocol processing on the data packet on which the lower-layer protocol processing has been performed, where the lower-layer protocol processing and the upper-layer protocol processing jointly accomplish complete protocol processing on the data packet.

Optionally, the processor 83 is configured to create, using a parent protocol stack instance that is in protocol stack instances and that is used to initially establish the target socket, the target socket that is not associated with any one of the protocol stack instances, where the parent protocol stack instance is selected by an APP in a random manner, or in a parameter specifying manner, or in a load balancing manner, perform, using the first protocol stack instance, lower-layer protocol processing on a data packet that is distributed to the first protocol stack instance, determine the target socket that is needed to perform upper-layer protocol processing on the data packet on which the lower-layer protocol processing has been performed, determine, according to affinity between each protocol stack instance included in the parallel protocol stack instances and the target socket, the second protocol stack instance in the protocol stack instances, where the affinity between the protocol stack instance and the target socket is used to indicate a quantity of data packets, on which the upper-layer protocol processing needs to be performed using the target socket, in data packets already distributed by the network adapter to the protocol stack instance, create an association between the target socket and the second protocol stack instance, and perform, using the target socket and the second protocol stack instance associated with the target socket, the upper-layer protocol processing on the data packet on which the lower-layer protocol processing has been performed, to obtain user data.

It should be noted that the lower-layer protocol processing and the upper-layer protocol processing jointly accomplish complete protocol processing on the data packet. For example, the lower-layer protocol processing completes protocol processing, on the data packet, at layer 3 or a layer lower than layer 3 stipulated in OSI, the upper-layer protocol processing completes protocol processing at layer 4 or a layer higher than layer 4 stipulated in the OSI, and the lower-layer protocol processing and the upper-layer protocol processing jointly accomplish protocol processing, on the data packet, at seven layers stipulated in the OSI.

The functional modules of the apparatus for processing a data packet based on parallel protocol stack instances provided in this embodiment may be configured to execute the procedures of the methods for processing a data packet based on parallel protocol stack instances shown in FIG. 1 and FIG. 2. A specific working principle thereof is not described in detail again, and for details, refer to the description in the method embodiments.

In this embodiment, lower-layer protocol processing is performed, using a first protocol stack instance, on a data packet that is distributed to the first protocol stack instance. An associated second protocol stack instance is determined using the target socket after a target socket that is needed to perform upper-layer protocol processing on the data packet on which the lower-layer protocol processing has been performed is determined, and the upper-layer protocol processing is performed, using the target socket and the second protocol stack instance, on the data packet on which the lower-layer protocol processing has been performed. A lower-layer protocol processing part and an upper-layer protocol processing part in protocol processing are separately completed by different protocol stack instances, and the second protocol stack instance that performs the upper-layer protocol processing is determined using the target socket. Therefore, a technical problem that protocol processing cannot be performed on a data packet because a protocol stack instance specified by an APP conflicts with a protocol stack instance specified by a network adapter is resolved.

Figure 10:
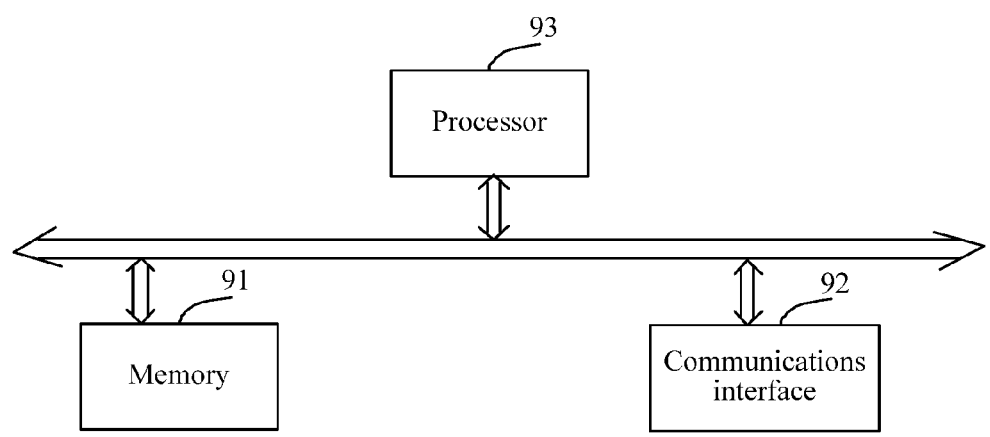
FIG. 10 is a schematic structural diagram of another apparatus for processing a data packet based on parallel protocol stack instances according to yet another embodiment of the present disclosure.

FIG. 10 is a schematic structural diagram of another apparatus for processing a data packet based on parallel protocol stack instances according to yet another embodiment of the present disclosure. As shown in FIG. 10, the apparatus in this embodiment may include a memory 91, a communications interface 92, and a processor 93.

The memory 91 is configured to store a program. The program may include program code, and the program code includes a computer operation instruction. The memory 91 may include a high-speed RAM memory, and may further include a non-volatile memory, for example, at least one magnetic disk storage.

The communications interface 92 is configured to receive a first data packet sent by an APP.

The processor 93 is configured to execute the program stored in the memory 91 in order to receive the first data packet sent by the APP, determine a target socket that is needed to perform protocol processing on the first data packet, determine, according to an association between the target socket and a second protocol stack instance, the second protocol stack instance that is associated with the target socket, and perform protocol processing on the first data packet using the target socket and the second protocol stack instance, where the association between the target socket and the second protocol stack instance is determined when the first protocol stack instance and the second protocol stack instance perform protocol processing on a second data packet, the first protocol stack instance performs lower-layer protocol processing on the second data packet, the second protocol stack instance performs upper-layer protocol processing on the second data packet, and the lower-layer protocol processing and the upper-layer protocol processing jointly accomplish complete protocol processing on the second data packet.

Optionally, the processor 93 is configured to determine, according to an affinity graph, whether a protocol stack instance associated with the target socket exists, determine the second protocol stack instance associated with the target socket if the protocol stack instance associated with the target socket exists, and perform protocol processing on the first data packet using the target socket and the second protocol stack instance, for example, add the first data packet to an APP data sending queue of the target socket, and separately perform the lower-layer protocol processing and the upper-layer protocol processing on the first data packet in the APP data sending queue using the target socket and the second protocol stack instance when the APP data sending queue of the target socket is obtained by means of polling according to a protocol stack instance association linked list that corresponds to the second protocol stack instance, where the protocol stack instance association linked list that corresponds to the second protocol stack instance is used to indicate a socket that is associated with the second protocol stack instance, and add a control message to a receiving queue of a parent protocol stack instance of the target socket if the protocol stack instance associated with the target socket does not exist, where the parent protocol stack instance of the target socket is a protocol stack instance used to create the target socket, and the control message is used to instruct to perform protocol processing on the first data packet, parse the control message to obtain the first data packet, and perform protocol processing on the first data packet using the parent protocol stack instance when the control message in the receiving queue is obtained by means of polling.

It should be noted that the lower-layer protocol processing and the upper-layer protocol processing jointly accomplish complete protocol processing on the data packet. For example, the lower-layer protocol processing completes protocol processing, on the data packet, at layer 3 or a layer lower than layer 3 stipulated in OSI, the upper-layer protocol processing completes protocol processing at layer 4 or a layer higher than layer 4 stipulated in the OSI, and the lower-layer protocol processing and the upper-layer protocol processing jointly accomplish protocol processing, on the data packet, at seven layers stipulated in the OSI.

The communications interface 92 is further configured to add, to a sending queue of a network adapter, the first data packet on which protocol processing has been performed such that the network adapter sends the first data packet on which protocol processing has been performed.

The functional modules of the apparatus for processing a data packet based on parallel protocol stack instances provided in this embodiment may be configured to execute the procedures of the methods for processing a data packet based on parallel protocol stack instances shown in FIG. 3 and FIG. 4. A specific working principle thereof is not described in detail again, and for details, refer to the description in the method embodiments.

In this embodiment, lower-layer protocol processing is performed, using a first protocol stack instance, on a data packet that is distributed to the first protocol stack instance. An associated second protocol stack instance is determined using the target socket after a target socket that is needed to perform upper-layer protocol processing on the data packet on which the lower-layer protocol processing has been performed is determined, and the upper-layer protocol processing is performed, using the target socket and the second protocol stack instance, on the data packet on which the lower-layer protocol processing has been performed. A lower-layer protocol processing part and an upper-layer protocol processing part in protocol processing are separately completed by different protocol stack instances, and the second protocol stack instance that performs the upper-layer protocol processing is determined using the target socket. Therefore, a technical problem that protocol processing cannot be performed on a data packet because a protocol stack instance specified by an APP conflicts with a protocol stack instance specified by a network adapter is resolved.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read only memory (ROM), a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for processing a data packet based on parallel protocol stack instances, comprising:
   performing, using a first protocol stack instance, lower-layer protocol processing on the data packet that is distributed by a network adapter to the first protocol stack instance;
   determining a target socket that is needed to perform upper-layer protocol processing on the data packet;
   determining, according to the target socket, a second protocol stack instance that is associated with the target socket; and
   performing, using the target socket and the second protocol stack instance, the upper-layer protocol processing on the data packet, wherein the lower-layer protocol processing and the upper-layer protocol processing jointly accomplish complete protocol processing on the data packet.

2. The method according to claim 1, wherein determining the second protocol stack instance comprises determining, according to an affinity that is in an affinity graph and that is between the target socket and each protocol stack instance comprised in the parallel protocol stack instances, the second protocol stack instance that is associated with the target socket, wherein the affinity between the target socket and each protocol stack instance is used to indicate a quantity of data packets, on which the upper-layer protocol processing needs to be performed using the target socket, in data packets already distributed by the network adapter to each protocol stack instance.

3. The method according to claim 2, wherein before determining the second protocol stack instance, the method further comprises updating, according to another quantity of data packets on which the lower-layer protocol processing has been performed, a first affinity that is recorded in the affinity graph and that is between the target socket and the first protocol stack instance.

4. The method according to claim 3, wherein after updating the first affinity that is recorded in the affinity graph and that is between the target socket and the first protocol stack instance, the method further comprises determining whether n×A is greater than B, wherein A is the first affinity between the target socket and the first protocol stack instance, wherein B is a second affinity that is recorded in the affinity graph and that is between the target socket and an associated protocol stack instance, wherein n is a preset coefficient, and wherein determining the second protocol stack instance that is associated with the target socket comprises:
   determining that the protocol stack instance that is recorded in the affinity graph and that is associated with the target socket is used as the second protocol stack instance that is associated with the target socket when n×A is not greater than B;
   determining the first protocol stack instance as the second protocol stack instance that is associated with the target socket when n×A is greater than B; and
   updating the protocol stack instance that is recorded in the affinity graph and that is associated with the target socket to the first protocol stack instance when n×A is greater than B.

5. The method according to claim 1, wherein performing the upper-layer protocol processing on the data packet comprises:
   adding, to a lower-layer data receiving queue of the target socket, the data packet on which the lower-layer protocol processing has been performed; and
   performing the upper-layer protocol processing on the data packet in the lower-layer data receiving queue using the second protocol stack instance when the target socket is obtained by means of polling according to a protocol stack instance association linked list that corresponds to the second protocol stack instance, wherein the protocol stack instance association linked list that corresponds to the second protocol stack instance is used to indicate a socket that is associated with the second protocol stack instance.

6. The method according to claim 1, further comprising:
   receiving a first data packet sent by an application (APP);
   determining the target socket that is needed to perform protocol processing on the first data packet;
   determining the second protocol stack instance that is associated with the target socket; and
   performing the protocol processing on the first data packet using the target socket and the second protocol stack instance.

7. A method for processing a data packet based on parallel protocol stack instances, comprising:
receiving a first data packet sent by an application (APP);
determining a target socket that is needed to perform protocol processing on the first data packet;
determining, according to an association between the target socket and a second protocol stack instance, the second protocol stack instance that is associated with the target socket; and
performing the protocol processing on the first data packet using the target socket and the second protocol stack instance, wherein the association between the target socket and the second protocol stack instance is determined when a first protocol stack instance and the second protocol stack instance perform the protocol processing on a second data packet, wherein the first protocol stack instance performs lower-layer protocol processing on the second data packet, wherein the second protocol stack instance performs upper-layer protocol processing on the second data packet, and wherein the lower-layer protocol processing and the upper-layer protocol processing jointly accomplish complete protocol processing on the second data packet.

8. The method according to claim 7, wherein performing the protocol processing on the first data packet using the target socket and the second protocol stack instance comprises:
adding the first data packet to an APP data sending queue of the target socket; and
performing the lower-layer protocol processing and the upper-layer protocol processing on the first data packet in the APP data sending queue separately using the target socket and the second protocol stack instance when the APP data sending queue of the target socket is obtained by means of polling according to a protocol stack instance association linked list that corresponds to the second protocol stack instance, wherein the protocol stack instance association linked list that corresponds to the second protocol stack instance is used to indicate a socket that is associated with the second protocol stack instance.

9. The method according to claim 7, wherein determining the second protocol stack instance that is associated with the target socket comprises:
determining, according to an affinity graph, whether a protocol stack instance associated with the target socket exists, wherein the affinity graph is used to record the protocol stack instance associated with the target socket; and
determining the protocol stack instance associated with the target socket as the second protocol stack instance when the protocol stack instance associated with the target socket exists.

10. The method according to claim 9, further comprising:
adding a control message to a receiving queue of a parent protocol stack instance of the target socket when the protocol stack instance associated with the target socket does not exist, wherein the parent protocol stack instance of the target socket is the protocol stack instance used to create the target socket, and wherein the control message is used to instruct to perform the protocol processing on the first data packet;
parsing the control message to obtain the first data packet when the control message in the receiving queue of the parent protocol stack instance is obtained by means of polling;
performing the protocol processing on the first data packet using the parent protocol stack instance; and
recording the parent protocol stack instance as the protocol stack instance that is recorded in the affinity graph and that is associated with the target socket.

11. An apparatus for processing a data packet based on parallel protocol stack instances, comprising:
a memory configured to store a program;
a communications interface coupled to the memory and configured to receive the data packet distributed to a first protocol stack instance; and
a processor coupled to the memory and configured to execute the program stored in the memory to:
perform, using the first protocol stack instance, lower-layer protocol processing on the data packet distributed to the first protocol stack instance;
determine a target socket that is needed to perform upper-layer protocol processing on the data packet;
determine, according to the target socket, a second protocol stack instance that is associated with the target socket; and
perform, using the target socket and the second protocol stack instance, the upper-layer protocol processing on the data packet, wherein the lower-layer protocol processing and the upper-layer protocol processing jointly accomplish complete protocol processing on the data packet.

12. The apparatus according to claim 11, wherein the processor is further configured to determine, according to an affinity that is in an affinity graph and that is between the target socket and each protocol stack instance comprised in the parallel protocol stack instances, the second protocol stack instance that is associated with the target socket, wherein the affinity between the target socket and each protocol stack instance is used to indicate a quantity of data packets, on which the upper-layer protocol processing needs to be performed using the target socket, in data packets already distributed by a network adapter to each protocol stack instance.

13. The apparatus according to claim 12, wherein the processor is further configured to update, according to another quantity of data packets on which the lower-layer protocol processing has been performed, a first affinity that is recorded in the affinity graph and that is between the target socket and the first protocol stack instance.

14. The apparatus according to claim 13, wherein the processor is further configured to:
determine whether n×A is greater than B, wherein A is the first affinity between the target socket and the first protocol stack instance, wherein B is a second affinity that is recorded in the affinity graph and that is between the target socket and an associated protocol stack instance, and wherein n is a preset coefficient;
determine that the protocol stack instance that is recorded in the affinity graph and that is associated with the target socket is used as the second protocol stack instance that is associated with the target socket when n×A is not greater than B;
determine the first protocol stack instance as the second protocol stack instance that is associated with the target socket when n×A is greater than B; and
update the protocol stack instance that is recorded in the affinity graph and that is associated with the target socket to the first protocol stack instance when n×A is greater than B.

15. The apparatus according to claim 11, wherein the processor is further configured to:

add, to a lower-layer data receiving queue of the target socket, the data packet; and perform the upper-layer protocol processing on the data packet in the lower-layer data receiving queue using the second protocol stack instance when the target socket is obtained by means of polling according to a protocol stack instance association linked list that corresponds to the second protocol stack instance, wherein the protocol stack instance association linked list that corresponds to the second protocol stack instance is used to indicate a socket that is associated with the second protocol stack instance.

16. The apparatus according to claim 11, wherein the processor is further configured to:

receive a first data packet sent by an application (APP);

determine the target socket that is needed to perform protocol processing on the first data packet;

determine the second protocol stack instance that is associated with the target socket; and perform the protocol processing on the first data packet using the target socket and the second protocol stack instance.

17. An apparatus for processing a data packet based on parallel protocol stack instances, comprising:

a memory configured to store a program;

a communications interface coupled to the memory and configured to receive a first data packet sent by an application (APP); and a processor coupled to the memory and configured to execute the program stored in the memory to:

determine a target socket that is needed to perform protocol processing on the first data packet;

determine, according to an association between the target socket and a second protocol stack instance, the second protocol stack instance that is associated with the target socket; and perform the protocol processing on the first data packet using the target socket and the second protocol stack instance, wherein the association between the target socket and the second protocol stack instance is determined when a first protocol stack instance and the second protocol stack instance perform the protocol processing on a second data packet, wherein the first protocol stack instance performs lower-layer protocol processing on the second data packet, wherein the second protocol stack instance performs upper-layer protocol processing on the second data packet, and wherein the lower-layer protocol processing and the upper-layer protocol processing jointly accomplish complete protocol processing on the second data packet.

18. The apparatus according to claim 17, wherein the processor is further configured to:

add the first data packet to an APP data sending queue of the target socket; and perform the lower-layer protocol processing and the upper-layer protocol processing on the first data packet in the APP data sending queue separately using the target socket and the second protocol stack instance when the APP data sending queue of the target socket is obtained by means of polling according to a protocol stack instance association linked list that corresponds to the second protocol stack instance, wherein the protocol stack instance association linked list that corresponds to the second protocol stack instance is used to indicate a socket that is associated with the second protocol stack instance.

19. The apparatus according to claim 17, wherein the processor is further configured to:

determine, according to an affinity graph, whether a protocol stack instance associated with the target socket exists, wherein the affinity graph is used to record the protocol stack instance associated with the target socket; and determine the protocol stack instance associated with the target socket as the second protocol stack instance when the protocol stack instance associated with the target socket exists.

20. The apparatus according to claim 19, wherein the processor is further configured to:

add a control message to a receiving queue of a parent protocol stack instance of the target socket when the protocol stack instance associated with the target socket does not exist, wherein the parent protocol stack instance of the target socket is the protocol stack instance used to create the target socket, and wherein the control message is used to instruct to perform the protocol processing on the first data packet;

parse the control message to obtain the first data packet when the control message in the receiving queue of the parent protocol stack instance is obtained by means of polling;

perform the protocol processing on the first data packet using the parent protocol stack instance; and record the parent protocol stack instance as the protocol stack instance that is recorded in the affinity graph and that is associated with the target socket.

* * * * *

UNITED STATES PATENT AND TRADEMARK OFFICE
CERTIFICATE OF CORRECTION

PATENT NO. : 10,069,947 B2
APPLICATION NO. : 15/222753
DATED : September 4, 2018
INVENTOR(S) : Yongqiang Yang, Fen Dai and Liufei Wen Page 1 of 1

It is certified that error appears in the above-identified patent and that said Letters Patent is hereby corrected as shown below:

On the Title Page

Item (30), Line 1: "201410043721" should read "201410043721.0"

Page (2), Item (56), OTHER PUBLICATIONS, Right Column, Line 22: "Form" should read "From"

Signed and Sealed this
Thirteenth Day of November, 2018

Andrei Iancu
*Director of the United States Patent and Trademark Office*